United States Patent
Kang et al.

(10) Patent No.: US 11,184,072 B2
(45) Date of Patent: Nov. 23, 2021

(54) METHOD FOR MEASURING AND REPORTING CHANNEL STATE INFORMATION IN WIRELESS COMMUNICATION SYSTEM AND DEVICE THEREFOR

(71) Applicant: LG Electronics Inc., Seoul (KR)

(72) Inventors: Jiwon Kang, Seoul (KR); Jonghyun Park, Seoul (KR); Kijun Kim, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/537,332

(22) Filed: Aug. 9, 2019

(65) Prior Publication Data
US 2020/0036424 A1  Jan. 30, 2020

Related U.S. Application Data

(63) Continuation of application No. PCT/KR2018/001749, filed on Feb. 9, 2018.
(Continued)

(51) Int. Cl.
*H04B 7/06* (2006.01)
*H04B 7/0417* (2017.01)

(52) U.S. Cl.
CPC ......... *H04B 7/0626* (2013.01); *H04B 7/0417* (2013.01)

(58) Field of Classification Search
CPC .. H04B 7/0621; H04B 7/0626; H04B 7/0632; H04B 7/0417; H04B 17/24; H04W 24/10; H04L 5/0057
See application file for complete search history.

(56) References Cited

U.S. PATENT DOCUMENTS

2014/0269368 A1  9/2014  Xu et al.
2016/0211902 A1  7/2016  Park et al.
(Continued)

FOREIGN PATENT DOCUMENTS

JP  2015521420  7/2015
KR  1020150036097  4/2015
(Continued)

OTHER PUBLICATIONS

R1-1611236 ("Independent and joint control of CSI-RS transmission and CSI reporting for NR MIMO", Huawei, HiSilicon, USA, Nov. 14-18, 2016 (Year: 2016).*
(Continued)

*Primary Examiner* — Aristocratis Fotakis
(74) *Attorney, Agent, or Firm* — Fish & Richardson P.C.

(57) ABSTRACT

A method for measuring and reporting channel state information (CSI) in a wireless communication system and a device therefor. Specifically, a method for reporting, by a user equipment, channel state information (CSI) in a wireless communication system includes: receiving CSI reporting setting information related with CSI reporting; receiving one or more channel state information (CSI)-reference signals (CSI-RSs); performing the CSI reporting by using a measurement value estimated by at least one specific CSI-RS among the one or more CSI-RSs, in which the at least one specific CSI-RS may be determined based on gap information for configuring a measurement interval for estimating the measurement value and a performing timing of the CSI reporting.

17 Claims, 15 Drawing Sheets

Related U.S. Application Data

(60) Provisional application No. 62/457,202, filed on Feb. 10, 2017.

(56) References Cited

U.S. PATENT DOCUMENTS

| | | | |
|---|---|---|---|
| 2016/0227519 A1* | 8/2016 | Nimbalker | H04W 72/042 |
| 2016/0270091 A1 | 9/2016 | Frenne et al. | |
| 2018/0241532 A1* | 8/2018 | Kakishima | H04B 7/0626 |
| 2018/0375560 A1* | 12/2018 | Wei | H04B 7/0486 |
| 2019/0098523 A1* | 3/2019 | Muruganathan | H04L 5/0048 |
| 2019/0207737 A1* | 7/2019 | Babaei | H04L 27/2607 |
| 2019/0349034 A1* | 11/2019 | Manolakos | H04B 7/0632 |
| 2019/0372642 A1* | 12/2019 | Kakishima | H04L 5/0048 |
| 2019/0379494 A1* | 12/2019 | Kakishima | H04L 5/005 |
| 2020/0021347 A1* | 1/2020 | Kim | H04W 24/10 |

FOREIGN PATENT DOCUMENTS

| | | |
|---|---|---|
| KR | 1020160093533 | 8/2016 |
| KR | 1020160111408 | 9/2016 |
| WO | WO2016163843 | 10/2016 |

OTHER PUBLICATIONS

R1-161237, "On the need for more flexible configurations related to CSI reporting", 3GPP TSG RAN WG1 Meeting #87, Huawei, HiSilicon, Reno, USA, Nov. 14-18, 2016 (Year: 2016).*

Canadian Office Action in Canadian Application No. 3053235, dated Oct. 7, 2020, 5 pages.

Japanese Office Action in Japanese Application No. 2019-543853, dated Oct. 13, 2020, 5 pages (with English translation).

Korean Office Action in Korean Application No. 10-2019-7023520, dated Sep. 22, 2020, 10 pages (with English translation).

LG Electronics, "Discussion on CSI framework for NR," R1-1702455, 3GPP TSG RAN WG1 Meeting #88, Athens, Greece, dated Feb. 13-17, 2017, 6 pages.

LG Electronics, "Views on CSI acquisition for NR," R1-1609253, 3GPP TSG RAN WG1 Meeting #86b, Lisbon, Portugal, dated Oct. 10-14, 2016, 7 pages.

Xinwei, "Further Discussion on CSI Framework Details," R1-1702023, 3GPP TSG-RAN WG1 #88, Athens, Greece, dated Feb. 13-17, 2017, 8 pages.

EP extended European search report, in European Appln. No. 18751181.1, dated Nov. 20, 2020, 11 pages.

Ericsson, "On Dynamic Signalling for Aperiodic and Semi-Persistent CSI-RS," R1-1700761, 3GPP TSG-RAN WG1 #87ah-NR, Spokane, WA, USA, dated Jan. 16-20, 2017, 6 pages.

Huawei, HiSilicon, "Independent and joint control of CSI-RS transmission and CSI reporting for NR MIMO," R1-1701681, 3GPP TSG RAN WG1 # 88 Meeting, Athens, Greece, dated Feb. 13-17, 2017, 7 pages.

Qualcomm Incorporated, "Details of CSI framework," R1-1702609, Presented at 3GPP TSG RAN WG1 #88, Athens, Greece, Feb. 13-17, 2017, 5 pages.

Notice of Allowance in Korean Appln. No. 10-2019-7023520, dated Sep. 27, 2021.

* cited by examiner

METHOD FOR MEASURING AND REPORTING CHANNEL STATE INFORMATION IN WIRELESS COMMUNICATION SYSTEM AND DEVICE THEREFOR

CROSS-REFERENCE TO RELATED APPLICATIONS

This application is a continuation of International Application No. PCT/KR2018/001749, filed on Feb. 9, 2018, which claims the benefit of U.S. Provisional Application No. 62/457,202, filed on Feb. 10, 2017. The disclosures of the prior applications are incorporated by reference in their entirety.

TECHNICAL FIELD

The present disclosure generally relates to a wireless communication system, and more particularly, to measuring and reporting channel state information (CSI).

BACKGROUND

Mobile communication systems have been generally developed to provide voice services while guaranteeing user mobility. Such mobile communication systems have gradually expanded from voice services to include data services up to high-speed data services. However, as current mobile communication systems suffer resource shortages and users demand even higher-speed services, development of more advanced mobile communication systems is needed.

The requirements of next-generation mobile communication systems will likely include supporting increased data traffic, a significant increase in transfer rates of each user, accommodation of significantly increased numbers of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

Implementations of the present disclosure enable measuring and reporting CSI based on a CSI framework.

In this regard, some implementations of the present disclosure enable calculating an estimation value for CSI reporting using a time gap that is configured by considering (i) a transmission timing of a CSI-reference signal (CSI-RS) and (ii) a CSI reporting timing at which the CSI reporting is performed.

Furthermore, some implementations of the present disclosure enable calculating an estimation value for CSI reporting by distinguishing whether there is a measurement restriction configured for a user equipment (UE).

The technical objects of the present disclosure are not limited to the aforementioned technical objects, and other technical objects, which are not mentioned above, will be apparently appreciated by a person having ordinary skill in the art from the following description.

Technical Solution

According to some implementations of the present disclosure, a method for reporting, by a user equipment, channel state information (CSI) in a wireless communication system, which includes: receiving CSI reporting setting information related with CSI reporting; receiving one or more channel state information (CSI)-reference signals (CSI-RSs); performing the CSI reporting by using a measurement value estimated by at least one specific CSI-RS among the one or more CSI-RSs, in which the at least one specific CSI-RS is determined based on gap information for configuring a measurement interval for estimating the measurement value and a performing timing of the CSI reporting.

Furthermore, in the method according to the implementation of the present disclosure, the at least one specific CSI-RS may be received before a timing indicated by the gap information based on the performing timing of the CSI reporting.

Furthermore, the method according to the implementation of the present disclosure may further include reporting the gap information of the UE to a base station, in which the gap information may be determined based on capability information of the UE.

Furthermore, in the method according to the implementation of the present disclosure, the gap information may be configured by considering a type of CSI to be reported by the UE by the base station.

Furthermore, in the method according to the implementation of the present disclosure, the CSI reporting setting information may further include indication information indicating whether there is a measurement restriction for the CSI reporting.

Furthermore, in the method according to the implementation of the present disclosure, the one or more CSI-RSs may correspond to CSI-RSs configured periodically or semi-persistently, and when the indication information indicates ON, the at least one specific CSI-RS may correspond to a last CSI-RS received before the timing indicated by the gap information based on the performing timing of the CSI reporting.

Furthermore, in the method according to the implementation of the present disclosure, the one or more CSI-RSs may correspond to CSI-RSs configured periodically or semi-persistently, and wherein when the indication information indicates OFF, the at least one specific CSI-RS may correspond to a CSI-RS received before the timing indicated by the gap information based on the performing timing of the CSI reporting.

Furthermore, in the method according to the implementation of the present disclosure, the measurement value may be an average value of one or more values calculated using the at least one specific CSI-RS.

Furthermore, in the method according to the implementation of the present disclosure, the average value may be calculated by applying a weighted average according to a reception timing of each of the at least one specific CSI-RSs.

Furthermore, in the method according to the implementation of the present disclosure, the measurement value may be a value estimated up to the timing indicted by the gap information based on the performing timing of the CSI reporting based on the value calculated using the at least one specific CSI-RS.

Furthermore, in the method according to the implementation of the present disclosure, when the one or more CSI-RSs correspond to aperiodic CSI-RSs, the at least one specific CSI-RS may correspond to an aperiodic CSI-RS received before the timing indicated by the gap information based on the performing timing of the CSI reporting.

Furthermore, in the method according to the implementation of the present disclosure, when the one or more CSI-RSs correspond to the aperiodic CSI-RSs, all CSI-RSs may correspond to aperiodic CSI-RSs received before the timing indicated by the gap information based on the performing timing of the CSI reporting.

Furthermore, in the method according to the implementation of the present disclosure, when the CSI reporting is configured aperiodically, the CSI reporting setting information may be received through downlink control information for triggering the CSI reporting.

Furthermore, the method according to the implementation of the present disclosure may further include receiving resource setting information related with transmission of the one or more CSI-RSs, in which the resource setting information may include first offset information indicating a gap between a triggering timing for transmission of the CSI-RS and a transmission timing of the CSI-RS, and the CSI reporting setting information may further include second offset information indicating a gap between a triggering timing for the CSI reporting and the performing timing of the CSI reporting.

Furthermore, in the method according to the implementation of the present disclosure, when transmission of the one or more CSI-RSs and the CSI reporting are jointly triggered, a difference value between a value indicated by the first offset information configured with respect to the at least one specific CSI-RS and a value indicated by the second offset information configured with respect to the CSI reporting may be larger than the value indicated by the gap information.

According to an implementation of the present disclosure, a UE reporting channel state information (CSI) in a wireless communication system, which includes: a radio frequency (RF) module for transmitting and receiving a radio signal; and a processor functionally connected with the RF module, in which the processor controls to receive CSI reporting setting information related with CSI reporting, receive one or more channel state information (CSI)-reference signals (CSI-RSs), perform the CSI reporting by using a measurement value estimated by at least one specific CSI-RS among the one or more CSI-RSs, and the at least one specific CSI-RS is determined based on gap information for configuring a measurement interval for estimating the measurement value and a performing timing of the CSI reporting.

Advantageous Effects

In some scenarios, implementations of the present disclosure may have one or more effects as follows. According to some implementations of the present disclosure, a time gap for calculating a measurement value of CSI reporting is configured for each UE (e.g., according to a UE capability), thus enabling non-uniform flexible CSI measurement and reporting.

Furthermore, according to some implementations of the present disclosure, CSI measurement and reporting are performed by considering a CSI calculation capability of the UE, thus enabling calculation of a most recent channel estimation value or interference estimation value allowed for the UE.

Advantages which may be obtained in the present disclosure are not limited to the aforementioned effects and other unmentioned advantages will be clearly understood by those skilled in the art from the following description.

BRIEF DESCRIPTION OF THE DRAWINGS

The accompanying drawings, which are included herein as a part of a description in order to help understanding of the present disclosure, provide embodiments of the present disclosure, and describe the technical features of the present disclosure with the description below.

DETAILED DESCRIPTION

Figure 1:
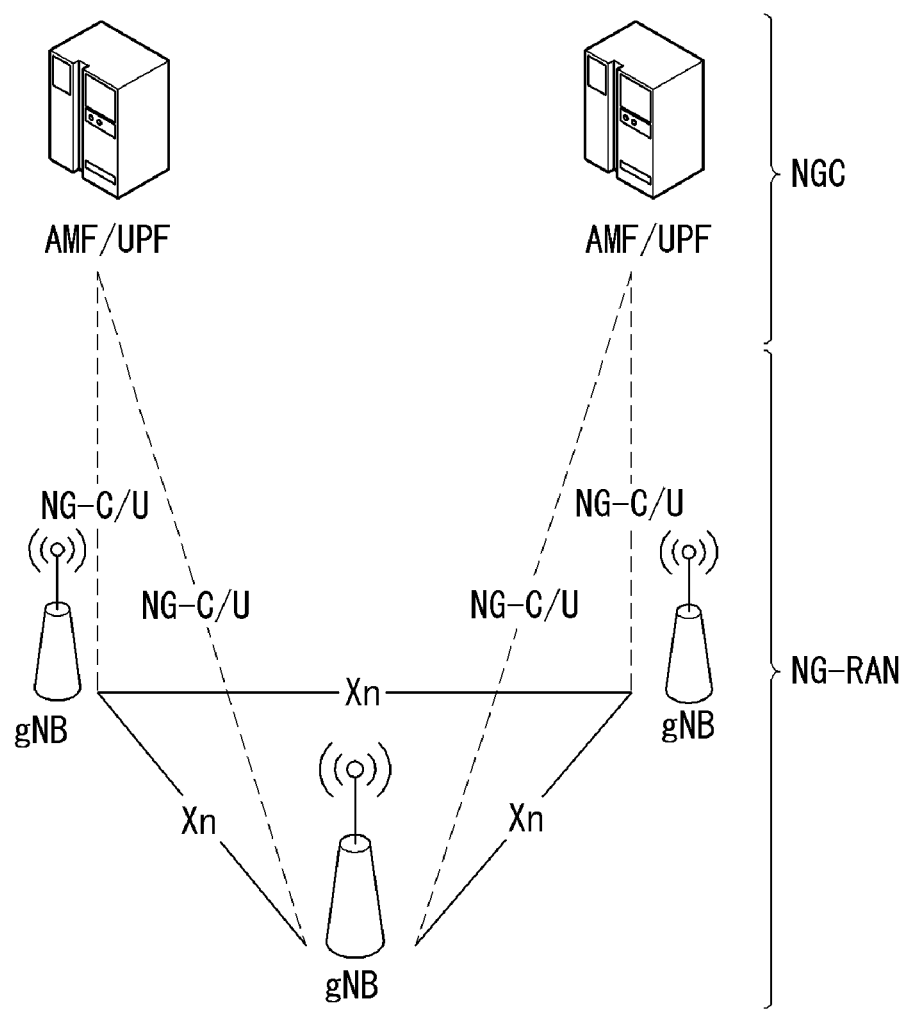
FIG. 1 illustrates an example of an overall structure of a new radio (NR) system to which implementations described by the present disclosure may be implemented.

Various examples of implementations of the present disclosure are described in detail with reference to the accompanying drawings. A detailed description to be disclosed along with the accompanying drawings is intended to describe some exemplary implementations of the present disclosure and is not intended to describe a sole implementation of the present disclosure. The following detailed description includes more details in order to provide full understanding of the present disclosure. However, those skilled in the art will understand that the present disclosure may be implemented without such more details.

In some cases, known structures and devices are omitted or may be shown in a block diagram form based on the core functions of each structure and device.

In this disclosure, a base station refers to a terminal node of a network that directly communicates with a terminal. In this document, a specific operation described as being performed by the base station may be performed by an upper node of the base station in some cases. That is, various operations performed for communication with the terminal in the network constituted by multiple network nodes including the base station may be performed by the base station or network nodes other than the base station. A 'base station (BS)' may also be referred to as a fixed station, a Node B, an evolved-NodeB (eNB), a base transceiver system (BTS), an access point (AP), a next generation NB, general NB, gNodeB (gNB), and the like. Further, a 'terminal' may be fixed or mobile and may be referred to as a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, and the like.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Implementations of the present disclosure may be supported by the standard documents disclosed in at least one of IEEE 802, 3GPP, and 3GPP2, that is, radio access systems. That is, steps or portions that belong to the implementations of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT(NR) is chiefly described, but the technical characteristics of the present disclosure are not limited thereto.

DESCRIPTION OF TERMS eLTE eNB: An eLTE eNB is an evolution of an eNB that supports a connection for an EPC and an NGC.

gNB: A node for supporting NR in addition to a connection with an NGC.

New RAN: A radio access network that supports NR or E-UTRA or interacts with an NGC.

Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC.

NG-U: A user plane interface used for NG3 reference point between new RAN and an NGC.

Non-standalone NR: A deployment configuration in which a gNB requires an LTE eNB as an anchor for a control plane connection to an EPC or requires an eLTE eNB as an anchor for a control plane connection to an NGC.

Non-standalone E-UTRA: A deployment configuration an eLTE eNB requires a gNB as an anchor for a control plane connection to an NGC.

User plane gateway: A terminal point of NG-U interface.

Overview of System

FIG. 1 is a diagram illustrating an example of an overall structure of a new radio (NR) system to which implementations described by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | Δf = $2^μ · 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In the implementations of the present disclosure, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB. Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
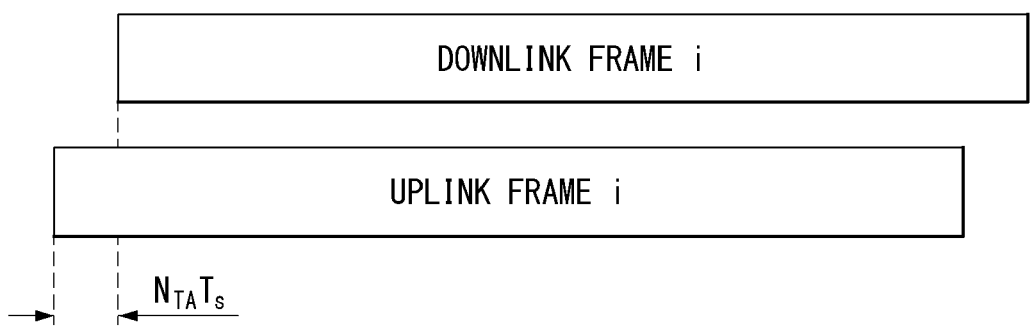
FIG. 2 illustrates a relationship between an uplink (UL) frame and a downlink (DL) frame in a wireless communication system to which implementations described by the present disclosure may be implemented.

FIG. 2 illustrates a relationship between a UL frame and a DL frame in a wireless communication system to which implementations described by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $N_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
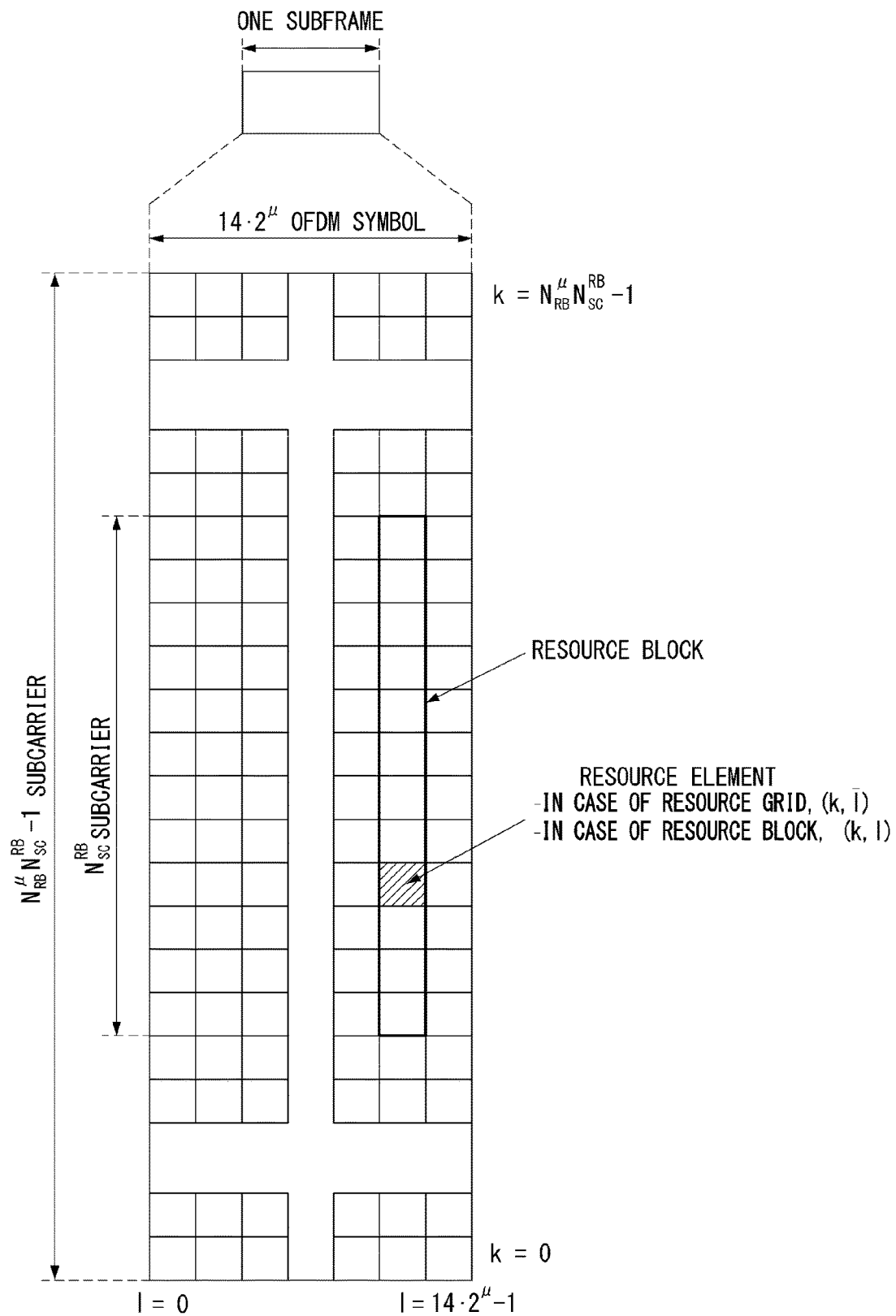
FIG. 3 illustrates an example of a resource grid supported in a wireless communication system to which implementations described by the present disclosure may be implemented.

FIG. 3 illustrates an example of a resource grid supported in a wireless communication system to which implementations described by the present disclosure may be implemented.

Referring to FIG. 3, a resource grid is composed of $N_{RB}^{\mu} N_{sc}^{RB}$ subcarriers in a frequency domain, each subframe composed of 14·2 μOFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols. Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 4:
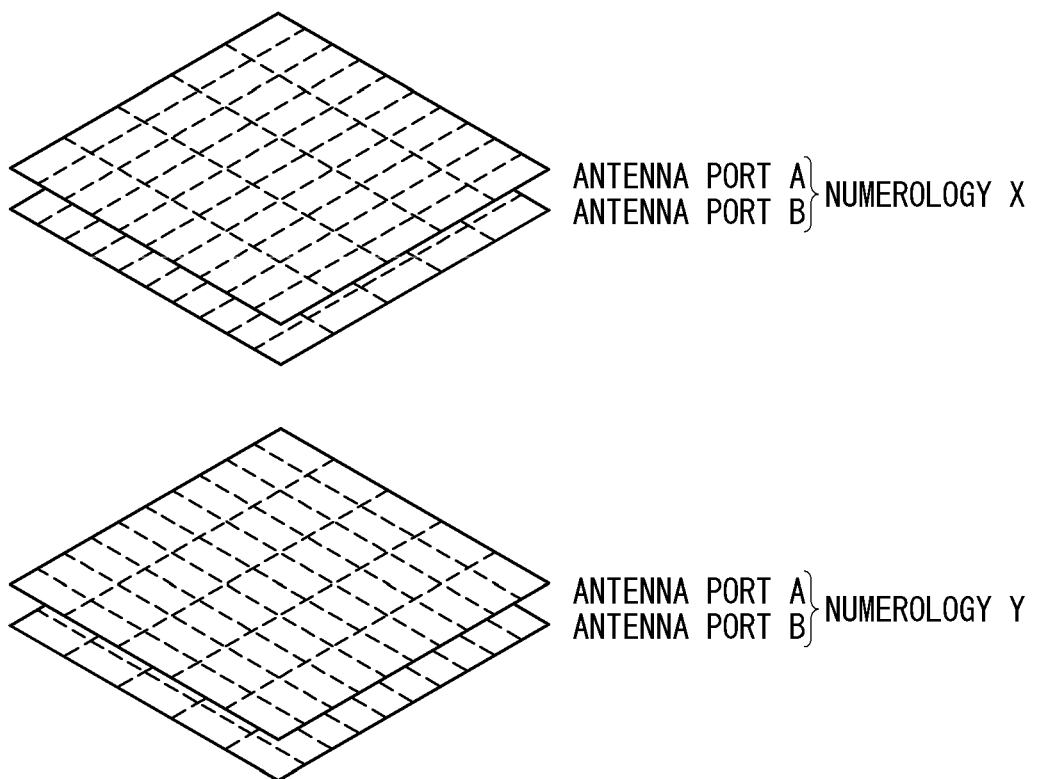
FIG. 4 illustrates examples of resource grids for each antenna port and numerology to which implementations described in this disclosure may be applied.

In this case, as illustrated in FIG. 4, one resource grid may be configured for the numerology μ and an antenna port p.

FIG. 4 shows an example of antenna ports and ringer-specific resource grids to which the method described herein may be applied.

Each element of the resource grid for the numerology μ and the antenna port p is indicated as a resource element, and may be uniquely identified by an index pair (k,l) Herein, $k=0, \ldots, N_{RB}^{\mu} N_{sc}^{RB}-1$ is an index in the frequency domain, and $l=0, \ldots, 2^{\mu} N_{symb}^{(\mu)}-1$ indicates a location of a symbol in a subframe. To indicate a resource element in a slot, the index pair (k,l) is used. Herein, $l=0, \ldots, N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Beam Management

In NR, beam management is defined as follows.

Beam management: A set of L1/L2 procedures for obtaining and maintaining a set of TRP(s) and/or UE beams that may be used for DL and UL transmission/reception, including at least:

Beam determination: operation of the TRP(s) or the UE selecting transmission/reception beam thereof.

Beam measurement: operation of the TRP(s) or the UE selecting transmission/reception beam thereof.

Beam reporting: operation in which the UE reports information of a beamformed signal based on beam measurement.

Beam sweeping: operation of covering a spatial region using a transmitted and/or received beam for a time interval in a predetermined scheme.

Further, Tx/Rx beam correspondence in the TRP and the UE is defined as follows:

The Tx/Rx beam correspondence in the TRP is maintained if at least one of the followings is satisfied:

The TRP may determine a TRP reception beam for uplink reception based on the UE's downlink measurement for one or more transmission beams of the TRP.

The TRP may determine a TRP Tx beam for downlink reception based on uplink measurement of the TRP for one or more Rx beams of the TRP.

The Tx/Rx beam correspondence in the UE is maintained if at least one of the followings is satisfied:

The UE may determine a UE Tx beam for uplink transmission based on downlink measurement of the UE for one or more Rx beams of the UE.

The UE may determine a UE reception beam for downlink reception based on an instruction of the TRP based on uplink measurement for one or more Tx beams.

A capability indication of UE beam correspondence related information is supported to the TRP.

The following DL L1/L2 beam management procedures are supported within one or more TRPs.

P-1: Used to enable UE measurement for different TRP Tx beams to support selection of TRP Tx beam/UE Rx beam(s).

For beamforming in the TRP, P-1 generally includes intra-TRP/inter-TRP Tx beam sweeps from a set of different beams. For beamforming in the UE, P-1 typically includes a UE Rx beam sweep from a set of different beams.

P-2: Used to allow UE measurements for different TRP Tx beams to change inter/intra-TRP Tx beam(s).

P-3: UE measurement for the same TRP Tx beam is used to change the UE Rx beam when the UE uses beamforming.

Aperiodic reporting triggered by the network is at least supported in P-1, P-2, and P-3 related operations.

The UE measurement based on RS for beam management (at least CSI-RS) is constituted by K (total number of beams) beams and the UE reports the measurement results of N selected Tx beams. Here, N is not particularly a fixed number. Procedures based on RS for mobility purposes are not excluded. Reporting information at least includes a measurement quantity for N beam(s) if N<K and information indicating N DL transmission beams. In particular, for UEs with K'>1 non-zero-power (NZP) CSI-RS resources, the UE may report N' CRIs (CSI-RS resource indicators).

The UE may be set as the following higher layer parameters for beam management.

N≥1 reporting setting and M≥1 resource setting

Links between reporting settings and resource settings are set in agreed CSI measurement settings.

CSI-RS-based P-1 and P-2 are supported with the resource and reporting settings.

P-3 may be supported with or without the reporting settings.

Reporting setting that includes at least:

Information indicating the selected beam

L1 measurement reporting time domain operation (e.g., aperiodic operation, periodic operation, semi-persistent operation)

frequency granularity when multiple frequency granularities are supported

Resource setting that includes at least:

time domain operation (e.g., aperiodic operation, periodic operation, semi-persistent operation)

RS type: at least NZP CSI-RS at least one CSI-RS resource set. Each CSI-RS resource set includes K≥1 CSI-RS resources (Some parameters of K CSI-RS resources may be the same. For example, port number, a time domain operation, density, and periodicity).

Further, NR supports a next beam report considering L group with L>1.

Information indicating minimal groups

Measurement quantity (L1 RSRP and CSI reporting support (when the CSI-RS is for CSI acquisition)) for N1 beam If applicable, information indicating N1 DL transmission beams The group-based beam reporting as described above may be configured on a UE-by-UE basis. Further, the group-based beam reporting may be turned off on the UE-by-UE basis (e.g., when L=1 or N1=1).

NR supports that UE may trigger a mechanism which the UE recovers from the beam failure.

A beam failure event occurs when a quality of a beam pair link of an associated control channel is sufficiently low (e.g., a comparison with a threshold, a timeout of an associated timer). The mechanism recovered from the beam failure is triggered when the beam failure occurs.

The network explicitly configures in the UE with resources for transmission of UL signals for recovery purpose. Configurations of the resources are supported where the base station is listening from all or some directions (e.g., random access region).

The UL transmission/resource reporting the beam failure may be located at the same time instance as the PRACH (the resource orthogonal to the PRACH resource) or at a difference time instance (configurable for the UE) from the PRACH. The transmission of the DL signal is supported so that the UE may monitor the beam to identify new potential beams.

The NR supports the beam management regardless of a beam-related indication. When the beam related indication is provided, information regarding a UE side beamforming/receiving procedure used for CIS-RS based measurement may be indicated to the UE through the QCL. As QCL parameters to be supported by the NR, parameters for delay, Doppler, average gain, etc. used in the LTE system and a spatial parameter for beamforming at a receiver is scheduled to be added and the QCL parameter may include angle of arrival related parameters in terms of UE reception beamforming and/or angle of departure related parameters in terms of base station reception beamforming. The NR supports the use of the same or different beams in the control channel and the corresponding data channel transmission.

For NR-PDCCH transmissions supporting robustness to beam pair link blocking, the UE may be configured to simultaneously monitor NR-PDCCH on M beam-pair links. Here, M≥1 and a maximum value of M may depend on at least a UE capability.

The UE may be configured to monitor the NR-PDCCH on different beam-pair link(s) in different NR-PDCCH OFDM symbols. Parameters related to a UE Rx beam configuration for monitoring the NR-PDCCH on multiple beam-pair links are configured by higher layer signaling or MAC CE and/or considered in a search space design.

At least, the NR supports an indication of a spatial QCL assumption between DL RS antenna port(s) and DL RS antenna port(s) for demodulation of the DL control channel. A candidate signaling technique for a beam indication for the NR-PDCCH (i.e., a configuration technique for monitoring the NR-PDCCH) includes MAC CE signaling, RRC signaling, DCI signaling, specification transparent and/or implicit techniques, and combinations of the signaling techniques.

For reception of a unicast DL data channel, the NR supports the indication of the spatial QCL assumption between the DL RS antenna port and the DMRS antenna port of the DL data channel.

Information indicating the RS antenna port is indicated via DCI (downlink grant). Further, the information also indicates the RS antenna port QCLed with the DMRS antenna port. A different set of DMRS antenna ports for a DL data channel may be represented as a different set of RS antenna ports and a QCL.

Hereinafter, prior to describing the techniques described in this disclosure in detail, contents directly or indirectly related to the techniques described in this disclosure will be briefly described first.

In next-generation communication including 5G, New Rat (NR), etc., as more and more communication devices require a larger communication capacity, there is a need for enhanced mobile broadband communication as compared with the existing radio access technology.

Further, massive machine type communications (MTCs), which provide various services anytime and anywhere by connecting many devices and objects, are one of the major issues to be considered in the next generation communication.

In addition, a communication system design or structure considering a service/UE sensitive to reliability and latency is being discussed.

The introduction of next generation radio access technology (RAT) considering enhanced mobile broadband communication (eMBB), massive MTC (mMTC), ultra-reliable and low latency communication (URLLC) is currently discussed, and in this disclosure, the technology is called 'new RAT (NR)' for convenience.

Self-Contained Slot Structure

Figure 5:
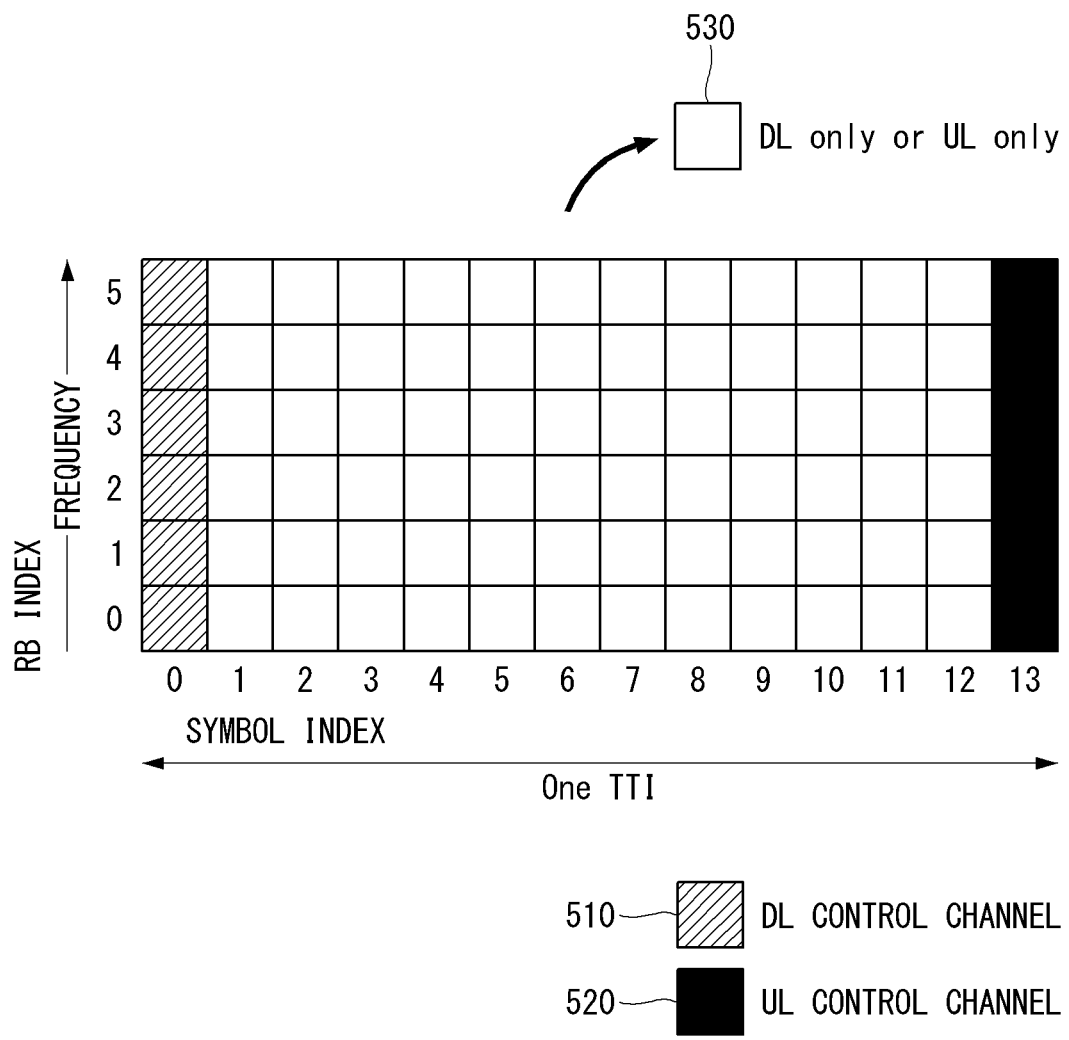
FIG. 5 is a diagram illustrating one example of a self-contained slot structure to which the method described in the present disclosure may be applied.

In order to minimize the latency of data transmission in a TDD system, the fifth generation new RAT considers a self-contained slot structure as shown in FIG. 5.

That is, FIG. 5 is a diagram illustrating one example of a self-contained slot structure to which the technique described in this disclosure may be applied.

In FIG. 5, a dashed area 510 indicates a downlink control area and a black area 520 indicates an uplink control area.

An unmarked area 530 may be used for downlink data transmission or for uplink data transmission.

Such a structure may be characterized in that DL transmission and UL transmission are sequentially performed in one slot, and DL data may be transmitted in one slot, and UL ACK/NACK may also be transmitted and received.

Such a slot may be defined as a 'self-contained slot'.

That is, through such a slot structure, it takes less time for the eNB to retransmit data to the UE when a data transmission error occurs, thereby minimizing the latency of final data transmission.

In such a self-contained slot structure, there is a need for a time gap between the eNB and the UE for the conversion process from the transmission mode to the reception mode or from the reception mode to the transmission mode.

To this end, some OFDM symbols at the time of switching from DL to UL in the slot structure are configured to a guard period (GP).

Analog Beamforming

In the millimeter wave (mmW), the wavelength is shortened, so that a plurality of antenna elements may be installed in the same area.

That is, a total of 64 (8×8) antenna elements may be installed in a 2-dimension array at a 0.5 lambda (wavelength) interval on a panel of 4×4 cm with a wavelength of 1 cm in a 30 GHz band.

Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource.

However, when the TXRUs are installed on all of approximately 100 antenna elements, there is a problem that effectiveness is deteriorated in terms of costs.

Therefore, a technique of mapping a plurality of antenna elements to one TXRU and adjusting a direction of a beam using an analog phase shifter is considered.

Such an analog beamforming technique has a disadvantage in that frequency selective beamforming may not be performed by making only one beam direction in all bands.

A hybrid BF (HBF) with B TXRUs, which is an intermediate form of digital BF and analog BF, and fewer than Q antenna elements, may be considered.

In the HBF, although there is a difference depending on a connection technique of B TXRUs and Q antenna elements, the number of directions of the beams that may be transmitted at the same time is limited to B or less.

Figure 6A:
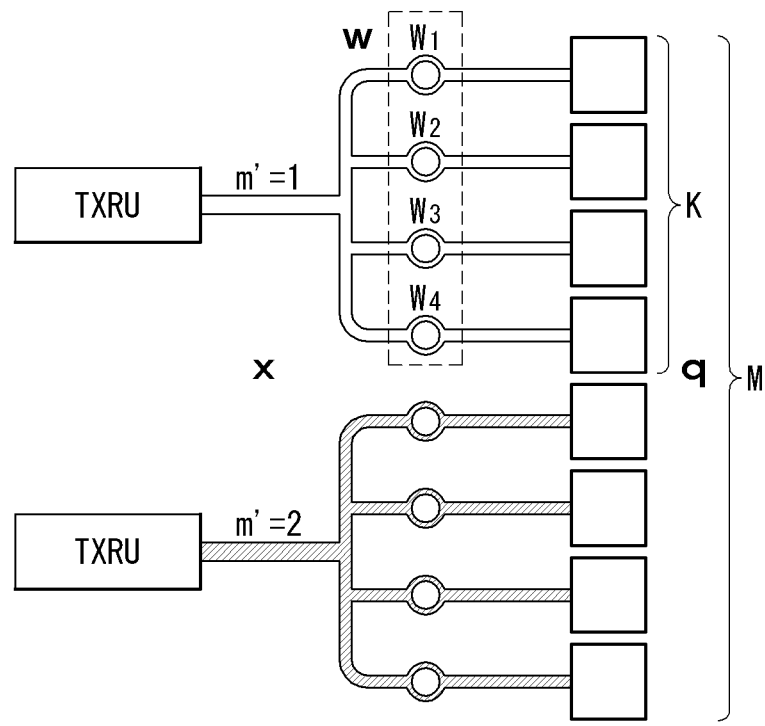
FIGS. 6A and 6B illustrate examples of a connection scheme of a TXRU and an antenna element to which implementations described in this disclosure may be applied.
Figure 6B:
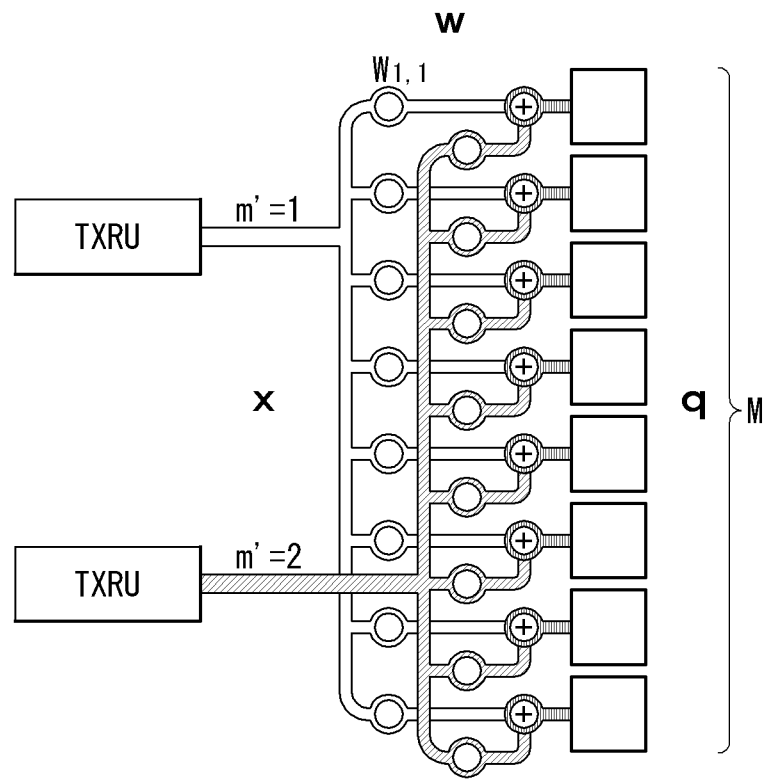

FIGS. 6A and 6B illustrate examples of a connection scheme of a TXRU and an antenna element to which implementations described in this disclosure may be applied.

Here, a TXRU virtualization model shows a relationship between an output signal of the TXRUs and an output signal of the antenna elements.

FIG. 6A illustrates an example of a scheme in which the TXRU is connected to a sub-array.

Referring to FIG. 6A, the antenna element is connected only to one TXRU. Unlike FIG. 6A, FIG. 6B illustrates a scheme in which the TXRU is connected to all antenna elements.

That is, in the case of FIG. 6B, the antenna element is connected to all TXRUs.

In FIGS. 6A and 6B, W represents a phase vector multiplied by an analog phase shifter.

In other words, a direction of analog beamforming is determined by W. Here, mapping of CSI-RS antenna ports and TXRUs may be 1-to-1 or 1-to-many.

CSI Feedback

In a 3GPP LTE/LTE-A system, user equipment (UE) is defined to report channel state information (CSI) to a base station (BS).

Here, the channel state information (CSI) collectively refers to information that may indicate the quality of a radio channel (or also referred to as a link) formed between the UE and the antenna port.

For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI.

The PMI is a value reflecting a channel space characteristic and represents a preferred precoding index preferred by the UE based on a metric such as SINR.

The CQI is a value representing the strength of the channel, and generally refers to a reception SINR that may be obtained when the BS uses the PMI.

In the 3GPP LTE/LTE-A system, the BS configures a plurality of CSI processes to the UE and may receive CSI for each process.

Here, the CSI process is constituted by a CSI-RS for signal quality measurement from the BS and a CSI-interference measurement (CSI-IM) resource for interference measurement.

Reference Signal (RS) Virtualization

In the mmW, it is possible to transmit a PDSCH only in one analog beam direction at a time by analog beamforming.

Therefore, the eNB transmits data only to a small number of some UEs in a specific direction.

Therefore, if necessary, the analog beam direction is differently configured for each antenna port so that data transmission may be simultaneously performed to a plurality of UEs in several analog beam directions.

Figure 7A:
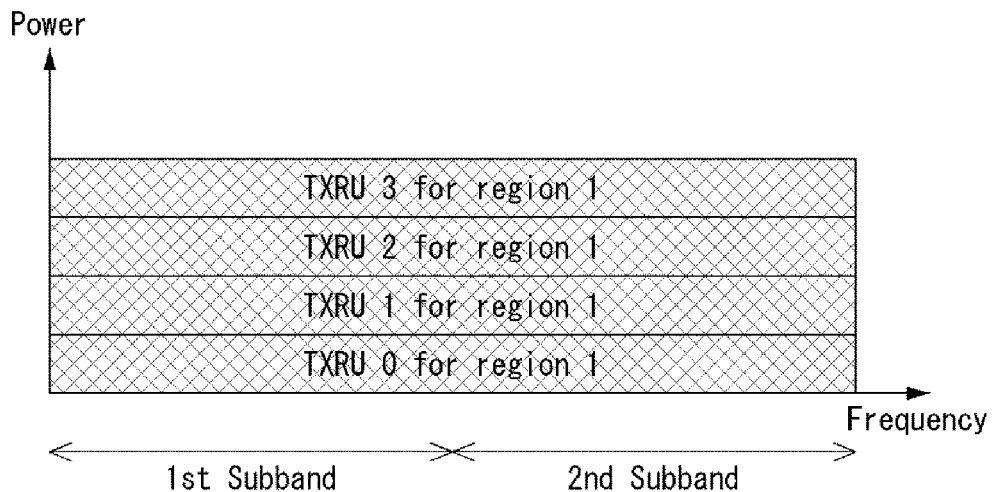
FIGS. 7A, 7B, and 7C illustrate various examples of a service area for TXRU to which implementations described in this disclosure may be applied.
Figure 7B:
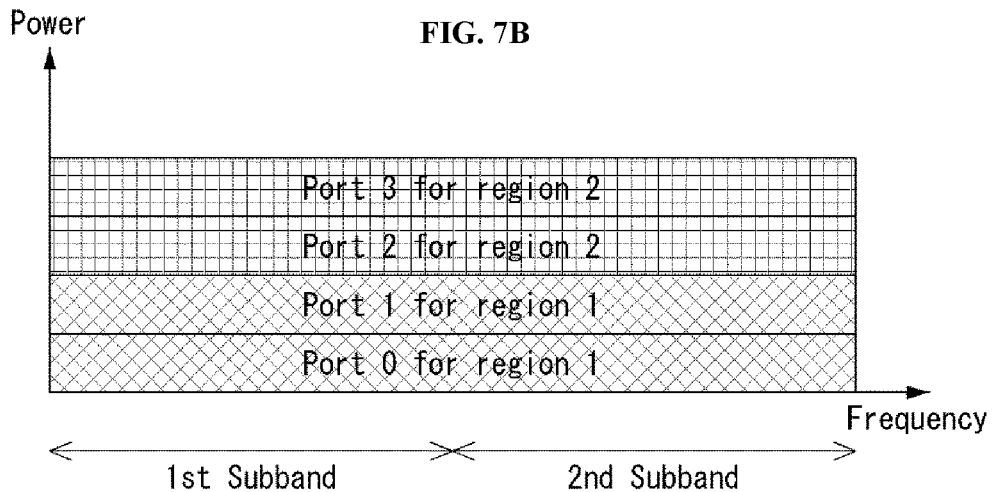
Figure 7C:
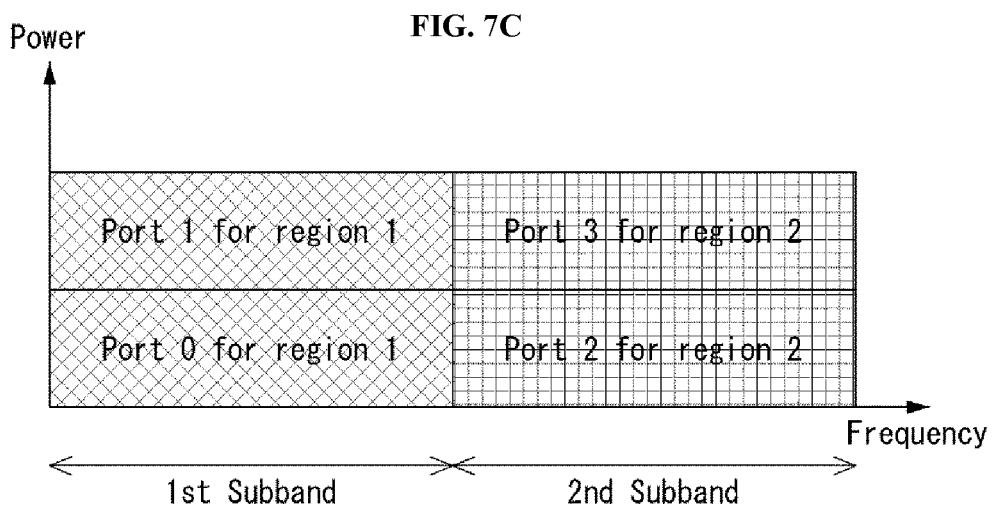

FIGS. 7A, 7B, and 7C illustrate various examples of a service area for TXRU to which implementations described in this disclosure may be applied.

In FIGS. 7A, 7B, and 7C, 256 antenna elements are divided into 4 parts to form 4 sub-arrays, and the structure of connecting the TXRU to each sub-array will be described as an example.

When each sub-array is constituted by a total of 64 (8×8) antenna elements in the form of a 2-dimensional array, specific analog beamforming may cover an area corresponding to a 15-degree horizontal angle area and a 15-degree vertical angle area.

That is, the zone where the eNB should be served is divided into a plurality of areas, and services are provided one by one at a time.

In the following description, it is assumed that the CSI-RS antenna ports and the TXRUs are 1-to-1 mapped.

Therefore, it may be interpreted that the antenna port and the TXRU have the same meaning as the following description.

If all TXRUs (antenna ports, sub-arrays) have the same analog beamforming direction as illustrated in FIG. 7A, the throughput of the corresponding zone may be increased by forming digital beam with higher resolution.

Further, it is possible to increase the throughput of the corresponding zone by increasing the RANK of the transmission data to the corresponding zone.

In addition, as illustrated in FIG. 7B, if each TXRU (antenna port, sub-array) has a different analog beamforming direction, the data may be transmitted simultaneously to UEs distributed in a wider area in the subframe (SF).

As illustrated in FIG. 7B, two of four antenna ports are used for PDSCH transmission to UE1 in region 1 and the remaining two antenna ports are used for PDSCH transmission to UE2 in Area 2.

Further, FIG. 7B illustrates an example in which PDSCH 1 transmitted to UE 1 and PDSCH 2 transmitted to UE 2 are subjected to spatial division multiplexing (SDM).

Unlike this, as illustrated in FIG. 7C, PDSCH 1 transmitted to UE 1 and PDSCH 2 transmitted to UE 2 may be transmitted by frequency division multiplexing (FDM).

Among a scheme of servicing one area using all the antenna ports and a scheme of servicing many areas at the same time by dividing the antenna ports, a preferred scheme may be changed according to the RANK and the MCS servicing to the UE for maximizing the cell throughput.

Further, the preferred scheme is changed according to the amount of data to be transmitted to each UE.

The eNB calculates a cell throughput or scheduling metric which may be obtained when one area is serviced using all the antenna ports, and calculates the cell throughput or scheduling metric which may be obtained when two areas are serviced by dividing the antenna ports.

The eNB compares the cell throughput or the scheduling metric which may be obtained by each scheme to select the final transmission scheme.

As a result, the number of antenna ports participating in PDSCH transmission is changed by SF-by-SF.

In order for the eNB to calculate the transmission MCS of the PDSCH according to the number of antenna ports and reflect the calculated transmission MCS to a scheduling algorithm, the CSI feedback from the appropriate UE is required.

Beam Reference Signal (BRS)

Beam reference signals are transmitted on one or more antenna ports ($p=\{0, 1, \ldots, 7\}$).

Reference sequence $r_l(m)$ is defined by Equation 2 in relation with generation of a sequence of the BRSs.

$$r_l(m) = \frac{1}{\sqrt{2}}(1 - 2 \cdot c(2m)) + j\frac{1}{\sqrt{2}}(1 - 2 \cdot c(2m+1)), \quad \text{[Equation 2]}$$
$$m = 0, 1, \ldots, 8 \cdot (N_{RB}^{max,DL} - 18) - 1$$

In Equation 2, l as 0 to 13 represents an OFDM symbol number. Further, c(i) denotes a pseudo-random sequence and a pseudo-random sequence generator may be initialized to Equation 3 at the beginning of each OFDM symbol.

$$C_{init} = 2^{10} \cdot (7 \cdot (n_s+1) + l'+1) \cdot (2 \cdot N_{ID}^{cell}+1) + 2 \cdot N_{ID}^{cell}+1 \quad \text{[Equation 3]}$$

Beam Refinement Reference Signal

Further, in relation with the beam refinement reference signal, the beam refinement reference signal is transmitted through antenna ports of up to 8 antenna ports (p=600 to 607).

In relation with the sequence generation of the beam refinement reference signal, reference signal $r_{l,n_s}(m)$ is generated as shown in Equation 4.

$$r_{l,n_s}(m) = \frac{1}{\sqrt{2}}(1 - 2c(2m)) + j\frac{1}{\sqrt{2}}(1 - 2c(2m+1)), \quad \text{[Equation 4]}$$
$$m = 0, 1, \ldots, \left\lfloor \frac{3}{8} N_{RB}^{max,DL} \right\rfloor - 1$$

In Equation 4, $n_s$ represents a slot number in a radio frame and l represents the OFDM symbol number in the slot. c(n) denotes the pseudo-random sequence and the pseudo-random sequence generator is initialized to Equation 5 at the beginning of each OFDM symbol.

$$C_{init} = 2^{10}(7(\bar{n}_s+1)+l+1)(2N_{ID}^{BRRS}+1) + 2N_{ID}^{BRRS}+1 \quad \bar{n}_s = n_s \bmod 20 \quad \text{[Equation 5]}$$

In Equation 5, $N_{ID}^{BRRS}$ is configured in the UE through an RRC signaling.

DL Phase Noise Compensation Reference Signal

A phase noise compensation reference signal associated with xPDSCH (i.e., the PDSCH supported by the NR system) is transmitted at the antenna port(s) p=60 and/or p=61 via A signaling in A DCI format. Further, the phase noise compensation reference signal is present and/or valid only for the xPDSCH transmission associated with the antenna port, and is transmitted only in the physical resource blocks and symbols to which an sPDSCH is mapped. Further, the phase noise compensation reference signal is the same in all symbols corresponding to xPDSCH allocation.

Reference sequence r(m) is defined by Equation 6 in relation with generation of the sequence of the phase noise compensation reference signal.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 6]}$$
$$m = 0, 1, \ldots, \left\lfloor \frac{3}{8} N_{RB}^{max,DL}/4 \right\rfloor - 1$$

In Equation 6, c(i) denotes the pseudo-random sequence and the pseudo-random sequence generator is initialized to Equation 7 at the beginning of each subframe.

$$C_{init} = (\lfloor n_s/2 \rfloor +1) \cdot (2n_{ID}^{(nSCID)}+1) \cdot 2^{10} + n_{SCID} \quad \text{[Equation 7]}$$

In Equation 7, in the case of transmission of the xPDSCH, $n_{SCID}$ is given by a DCI format related with the transmission of the xPDSCH and otherwise, $n_{SCID}$ is set to 0.

Further, in the case of 3-dimension multiple-input multiple-output (3D-MIMO) or full-dimension multiple-input multiple-output (MIMO) technology, an active antenna system (AAS) having a 2-dimensional planar array structure may be used.

Figure 8:
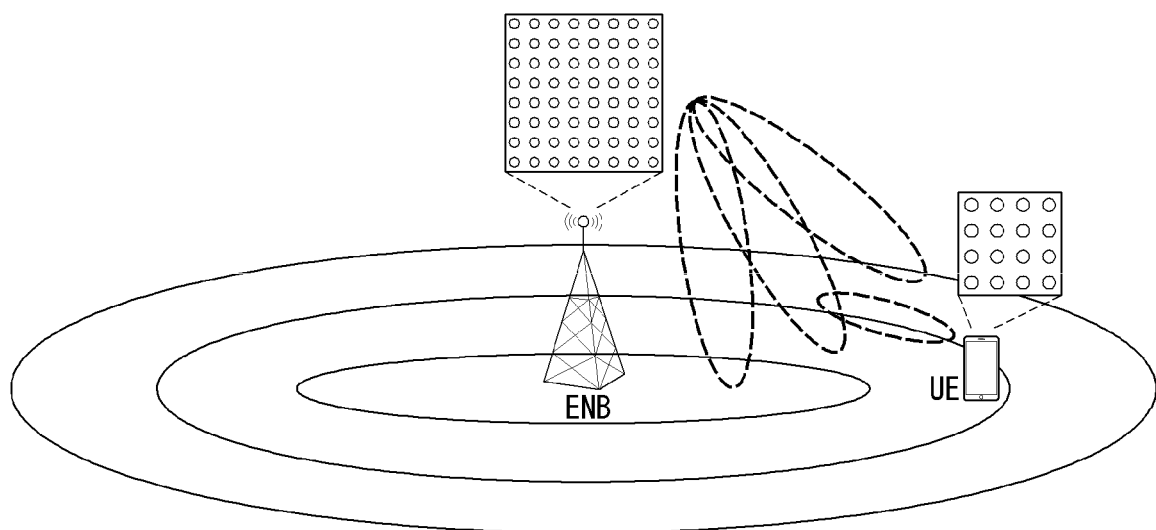
FIG. 8 illustrates an example of an MIMO system using a 2D plane array structure to which implementations described in this disclosure may be applied.

FIG. 8 illustrates an example of an MIMO system using a 2D plane array structure to which implementations described in this disclosure may be applied.

Through the 2D plane array structure, a large number of antenna elements may be packed within available base station type of elements and an adaptive electronic capability in a 3D space may be provided.

In relation with an MIMO design of the NR system, a CSI framework for measuring and reporting a channel state between the eNB and the UE is considered.

This disclosure describes examples of techniques for reporting CSI based on a CSI framework (or CSI acquisition framework) to be described below. Specifically, this disclosure describes examples of techniques for determining a measurement interval (or timing) for CSI measurement (or estimation) based on a CSI reporting setting of the CSI framework. For example, a technique for determining a time gap of CSI-RS(s) and/or CSI measurement used for measuring the CSI is described.

First, the CSI framework considered in the NR system will be described in detail.

The CSI framework may mean that a CSI-related procedure is defined using a CSI reporting setting, a resource setting, a CSI measurement setting, and a CSI measurement setting. This is in contrast to some systems, such as those compatible with LTE, in which the CSI related procedure is defined only in the form of a CSI process. Accordingly, according to implementations of the present disclosure which are compatible with NR, the CSI-related procedures may be performed in a more flexible manner according to a channel situation and/or resource situation.

For example, a configuration for the CSI-related procedure in the NR system may be defined by combining the CSI reporting setting, the resource setting, and the CSI measurement setting.

As a specific example, the UE may be configured to acquire the CSI by using N≥1 CSI reporting settings, M≥1 resource settings, and one CSI measurement setting. Here, the CSI measurement setting may include setting information for a link between N CSI reporting settings and M resource settings. Further, here, the resource settings include reference signal (RS) settings and/or Interference Measurement settings (IM settings).

Figure 9:
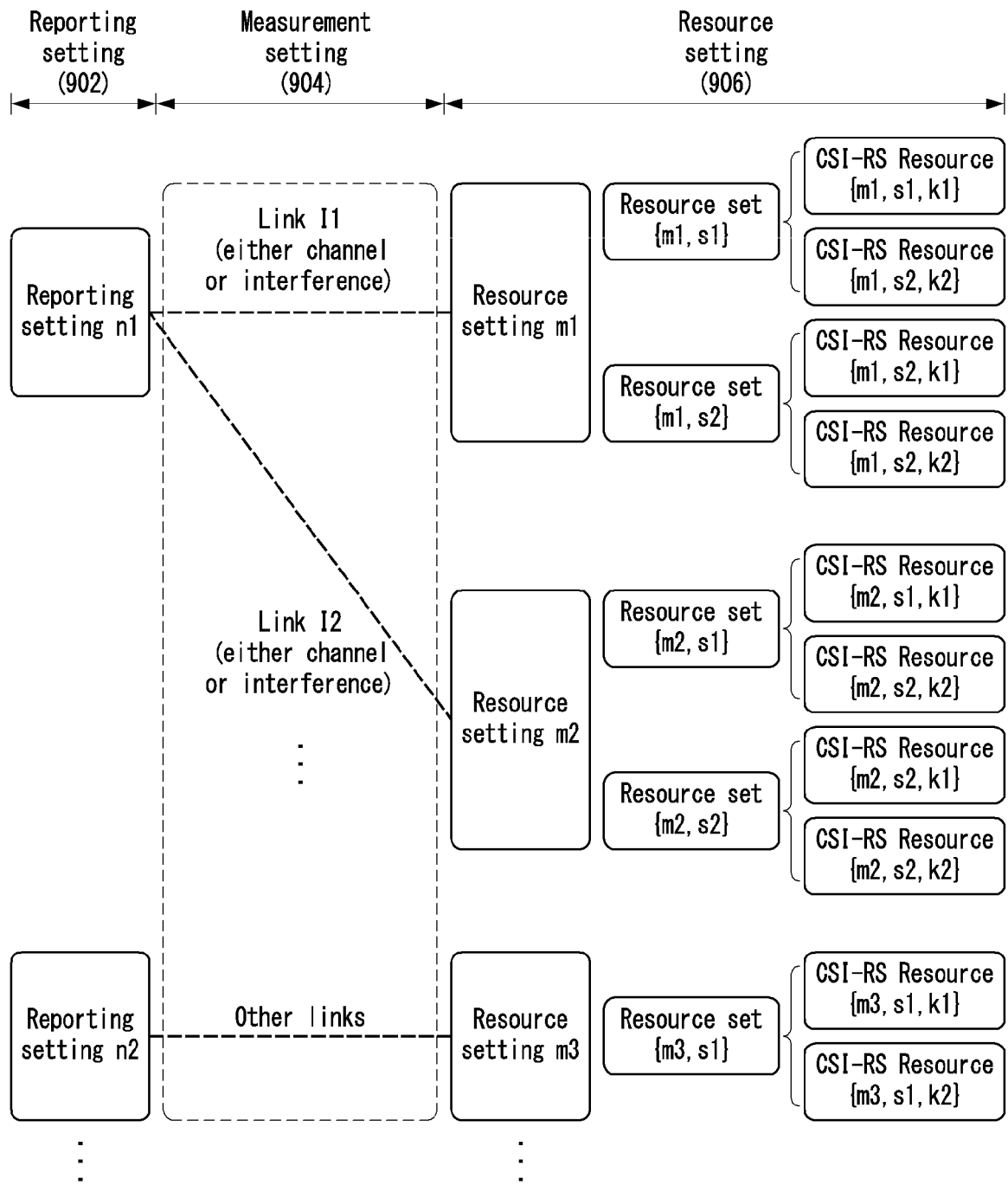
FIG. 9 illustrates an example of a CSI framework considered in an NR system to which implementations described in this disclosure may be applied.

FIG. 9 illustrates an example of a CSI framework considered in an NR system to which implementations described in this disclosure may be applied.

Referring to FIG. 9, a CSI framework may be configured by reporting setting 902, measurement setting 904, and resource setting 906. Here, the reporting setting may include the CSI reporting setting, the measurement setting may include the CSI measurement setting, and the resource setting may include the CSI-RS resource setting.

As illustrated in FIG. 9, the reporting setting 902 may be constituted by N (N≥1) report settings (e.g., Reporting setting n1, Reporting setting n2, etc.).

Further, the resource setting 906 may be constituted by M (M≥1) resource settings (e.g., Resource setting m1, Resource setting m2, Resource setting m3, etc.). Here, each resource setting may include S (S≥1) resource sets and each resource set may include K (K≥1) CSI-RSs.

Further, the measurement setting 904 may include setting information indicating the link between the reporting setting and the resource setting and a measurement type configured for the corresponding link. In this case, each measurement setting may include L (L≥1) links. For example, the measurement setting may include setting information for a link (Link l1) between Reporting setting n1 and Resource setting m1, setting information for a link (Link l2) between Reporting setting n1 and Resource setting m2, and the like.

In this case, each of Link l1 and Link l2 may be configured as any one of a channel measurement link or an interference measurement link. Moreover, Link l1 and/or Link l2 may be configured for rate matching or other purposes.

In this case, one or more CSI reporting settings within one CSI measurement setting may be selected dynamically via Layer 1 (L2) signaling or L2 (Layer 2) signaling. Further, one or more CSI-RS resource sets selected from at least one resource setting and one or more CSI-RS resources selected from at least one CSI-RS resource set are also dynamically selected via the L1 or L2 signaling.

Hereinafter, the CSI reporting setting, the resource setting (i.e., CSI-RS resource setting), and the CSI measurement setting constituting the CSI framework considered in the NR system will be described.

CSI Reporting Setting

First, the CSI reporting setting may include information for setting a type of CSI reporting which the UE is to perform with respect to the eNB, information included in the CSI reporting, and the like.

For example, the CSI reporting setting may include a time-domain behavior type of a time domain, frequency granularity, CSI parameters (e.g., Precoding Matrix Indicator (PMI), Rank Indicator (RI), and Channel Quality Indicator (CQI)) to be reported, a CSI type (e.g., CSI Type 1 or 2, CSI with high complexity, or CSI with low complexity), a codebook configuration including codebook subset restriction, a measurement restriction configuration, and the like.

In this disclosure, the operation type of the time domain may be an aperiodic operation, a periodic operation, or a semi-persistent operation.

In this case, a setting parameter(s) for the CSI reporting setting may be configured (or indicated) through higher layer signaling (e.g., RRC signaling).

Resource Setting

Next, the resource setting may include information for setting one or more resources to be used for CSI measurement and reporting. For example, the resource setting may include an operation pattern of the time domain, a type (e.g., Non-Zero Power CSI-RS (NZP CSI-RS), Zero Power CSI-RS (ZP CSI-RS), DMRS, etc.) of the RS, a resource set constituted by K resources, and the like.

As mentioned above, each resource setting may include one or more resource sets, and each resource set may include one or more resources (e.g., CSI-RS resources). Further, the resource setting may include a setting for a signal for channel measurement and/or interference measurement.

As an example, each resource setting may include setting information for S number of resource sets (e.g., CSI-RS resource sets) and may also include setting information for K number of resources for each resource set. In this case, each resource set may correspond to sets that are differently selected from a pool of all CSI-RS resources configured for the UE. Further, the setting information for each resource may include information related to a resource element, the number of ports, the operation type of the time domain, and the like.

Alternatively, as another example, each resource setting may include setting information for S CSI-RS resources and/or K CSI-RS resources of ports of a number equal to or smaller than each CSI-RS resource.

In this case, a CSI-RS RE mapping pattern of an N-port CSI-RS resource may be constituted by one or more CSI-RS mapping patterns of CSI-RS resources of the same or smaller number. Here, the CSI-RS RS mapping pattern may be defined in the slot and spanned to multiple configurable consecutive/inconsecutive OFDM symbols.

In this case, a setting parameter(s) for the resource setting may be configured through higher layer signaling (e.g., RRC signaling).

CSI Measurement Setting

Next, the CSI measurement setting may include setting information indicating which measurement the UE is to perform with respect to a specific CSI reporting setting and a specific resource setting mapped thereto for the CSI reporting. For example, the CSI measurement setting may include information on the link between the CSI reporting setting and the resource setting and may include information indicating a measurement type for each link. Further, the measurement type may be channel measurement, interference measurement, rate matching, etc.

As an example, the CSI measurement setting may include information indicating the CSI reporting setting, information indicating the resource setting, and a setting for a reference transmission scheme in the case of the CQI. In this regard, the UE may support L≥1 CSI measurement settings and an L value may be set according to a capability of the corresponding UE.

In this case, one CSI reporting setting may be connected to one or more resource settings and multiple CSI reporting settings may be connected to the same resource setting.

In this case, a setting parameter(s) for the CSI measurement setting may be configured through higher layer signaling (e.g., RRC signaling).

Further, in some implementations, in regards to the CSI reporting setting, the resource setting, and the CSI measurement setting, the operation type of the time domain may be implemented as follows.

First, in the case of the periodic CSI-RS (i.e., a case where transmission of the CSI-RS is periodically performed), semi-persistent CSI reporting may be activated/deactivated by MAC CE and/or downlink control information (DCI). Unlike this, the aperiodic CSI reporting may be triggered by the DCI, however, in this case, additional signaling configured to the MAC CE may be required.

Next, in the case of the semi-persistent CSI-RS (i.e., a case where transmission of the CSI-RS is semi-persistently performed), periodic CSI reporting is not supported. On the contrary, semi-persistent CSI reporting may be activated/deactivated by the MAC-CE and/or DCI and the semi-persistent CSI-RS may be activated/deactivated by the MAC-CE and/or DCI. Further, in this case, the aperiodic CSI reporting may be triggered by the DCI and the semi-persistent CS-RS may be activated/deactivated by the MAC-CE and/or DCI.

Last, in the case of the aperiodic CSI-RS (i.e., a case where transmission of the CSI-RS is aperiodically performed), the periodic (and semi-persistent) CSI reporting is not supported. On the contrary, the aperiodic CSI reporting may be triggered by the DCI and the aperiodic CS-RS may be triggered by the DC and/or MAC-CE.

It is to be understood that the implementations described in this disclosure are just distinguished for easy description and some configurations or features of certain implementations may be included in other implementations or may be replaced with corresponding configurations or features of other implementations. For example, hereinafter, schemes to be described in first to third implementations may be applied to a scheme to be described in a fourth implementation and vice versa.

Hereinafter, setting techniques which may be considered with respect to the resource setting (i.e., CSI-RS resource setting), CSI measurement setting, and CSI reporting setting will be described.

First Implementation—Techniques for Resource Setting

First, in relation with the above-described resource setting, the CSI-RS resource setting may include two types of RS types such as NZP CSI-RS and ZP CSI-RS (for reference, the CSI-RS mentioned in this disclosure may be applied to both the NZP CSI-RS and the ZP CSI-RS).

Both the NZP CSI-RS resource and the ZP CSI-RS resource may be set within the corresponding resource settings because the use of a specific resource is indicated within each of the CSI measurement settings. Here, the ZP CSI-RS may be used for interference estimation (i.e., interference measurement) or rate matching for data channels (e.g., NR-PDSCH). In addition, the NZP CSI-RS may be applied not only for channel estimation (i.e., channel measurement) but also for interference estimation.

Further, the NZP CSI-RS included in the resource setting may be applied to both CSI acquisition and beam management.

Specifically, the CSI-RS resources for beam management may also be included in a resource setting for a unified operation for analog beam selection and digital beam selection. One of the main functions of CSI acquisition is beam selection through UE feedback information such as PMI and CSI-TE Resource Indication (CRI). The purpose of DL beam management may also be to select the beam(s) and the TRP transmission beam may be selected via the UE feedback information. Only the additional function of DL beam management is to select a UE reception beam, but the UE reception beam selection may be supported simply by transmitting a plurality of repeated transmit beams via CSI-RS symbols or sub-symbols. As a result, the above-described CSI framework may also be used for the purpose of beam management.

For such a resource setting, three time-domain operation types may be supported, such as aperiodic CSI-RS, semi-persistent CSI-RS, and periodic CSI-RS. In this case, the three types of time-domain operation types described above may be commonly applied to both the NZP CSI-RS and the ZP CSI-RS. In this regard, an aperiodic Interference Measurement Resource (IMR) and a semi-persistent IMR may provide high interference estimation accuracy and high flexibility for a system design, considering a dynamic TDD operation and forward compatibility of the NR system.

Further, the resource setting may include a CSI-RS timing offset (hereinafter, referred to as 'X'). Here, X may refer to a time gap between a triggering/activation/deactivation timing (instance) and an actual CSI-RS transmission timing of the CSI-RS.

In this case, X may be expressed in the form of the number of slots (i.e., slot unit) or the number of symbols (i.e., symbol unit). As an example, if aperiodic CSI-RS triggering is performed by the DCI, then X may be set to '0'.

In various implementations of the present disclosure, if X is set by the network (i.e., eNB), then candidate values of X may be indicated by a higher layer message (e.g., RRC message) and included in the resource setting on the CSI framework. Here, a case where X is supported to be set is assumed. Here, the candidate values of X may include predetermined X values according to a predetermined reference (or according to a standard). For example, X may be set to a specific value (e.g., 0), but set to values (e.g., 0, 1, 2) which may be used differently according to a situation (or service).

As a specific example, the UE may be indicated '1' as the X value for beam management from the eNB. As a result, when the transmission of the CSI-RS is triggered at a specific timing, the corresponding UE may recognize that the CSI-RS is transmitted after a time gap (e.g., 2 slots) corresponding to '1' based on the specific timing.

Alternatively, as another specific example, the X values in a service (e.g., Ultra-Reliable and Low Latency Communications (URLLC)) requiring a short latency may be set shorter than other services.

In this case, the X value to be applied for the channel measurement or interference measurement may be indicated through dynamic signaling such as the L1 or L2 signaling (e.g., DCI or MAC-CE). In particular, the indication for the X value may be included in the MAC-CE and/or DCI for the CSI-RS triggering and together transferred. That is, the corresponding X value may be transferred together with triggering information (e.g., triggered CSI-RS resource setting) for the CSI-RS.

Further, for the CSI-RS triggering, a hierarchical signaling structure may be applied, in which a candidate resource is selected through the MAC-CE in the resource setting configured by the RRC signaling and then, a final resource is selected by the DCI. In this case, the X value may be included in any one of the MAC-CE or the DCI. Alternatively, a candidate group may be selected through the MAC-CE and then, a final X value may be set (or indicated) through the DCI. That is, the X value may be hierarchically indicated for the UE by using the RRC signaling, the MAC-CE, and/or the DCI.

Further, the X value may be used for configuring whether to apply a technique for determining a CSI measurement gap described in this disclosure in a specific situation (e.g., a case where both CSI-RS triggering and CSI reporting triggering are performed). Detailed contents thereof will be described in detail in a subsequent part of FIG. 12.

Second Implementation—Techniques for CSI Measurement Setting

Next, in relation with the above-described CSI measurement setting, according to implementations of the present disclosure that are compatible with NR systems, a flexible measurement setting may be enabled, which supports a predetermined combination of the aperiodic/semi-persistent/periodic resource setting for channel measurement and the aperiodic/semi-persistent/periodic resource setting for interference.

For example, semi-persistent or periodic interference measurement resources (e.g., ZP CSI-RS and NZP CSI-RS) may be utilized to avoid or minimize L1/L2 control signaling when considering semi-persistent CSI reporting or periodic CSI reporting. Further, the aperiodic CSI-RS setting may be associated with semi-persistent or periodic interference measurement resources for the aperiodic CSI reporting. Conversely, the semi-persistent or periodic CSI-RS may be associated with the aperiodic interference measurement resources for the aperiodic CSI reporting.

In conclusion, the measurement setting supports a flexible mapping scheme among the aperiodic/semi-persistent/persistent CSI reporting, the aperiodic/semi-persistent/persistent resource setting (e.g., NZP CSI-RS) for the channel measurement, and the aperiodic/semi-persistent/persistent resource settings (e.g., NZP CSI-RS and NZP CSI-RS) for the interference measurement.

Further, in various implementations of the present disclosure, a specific resource (i.e., resource setting) in the CSI measurement setting may be set for the purpose of the rate matching during demodulation of a data channel (e.g., NR-PDSCH). For example, if it is determined that the interference given (or received) by the corresponding CSI-RS resource is large, such as the ZP CSI-RS of the legacy LTE system, then the eNB may configure the corresponding resource for the purpose of nulling. Therefore, the degree of interference which may occur in the channel measurement or interference measurement of the UE receiving the corresponding indication may be efficiently controlled.

Third Implementation—Techniques for CSI Reporting Setting

Next, in relation with the above-described CSI reporting setting, implementations of the present disclosure that are compatible with NR systems may support the aperiodic CSI reporting, the semi-persistent CSI reporting, and the periodic CSI reporting.

In this case, appropriate CSI reporting contents are defined according to the above-described CSI measurement setting configuration.

First, if the CSI-RS resource(s) for CSI acquisition is indicated in a specific measurement setting, then the corresponding CSI reporting contents may be CSI reporting types that are supported in some systems, such as those compatible with LTE systems (in particular, eFD-MIMO WI).

By contrast, if the CSI-RS resource(s) for beam management are indicated in a specific measurement setting, then the corresponding CSI report contents may be determined based on required reporting contents in order to support DL beam management. Since respective CSI-RS ports in the CSI resource may correspond to different analog beams, the corresponding CSI reporting contents may be information (e.g., {CRI, port index}) configured by a pair for reporting appropriate beam direction information. In addition to beam related information, a beam gain related metric such as RSRP needs to be reported together.

Further, the CSI reporting setting may include a CSI-RS reporting offset (hereinafter, referred to as 'Y'). Here, Y may refer to the time interval between the triggering/activation/deactivation timing for the CSI reporting and the actual CSI reporting instance or timing.

As an example, in a DL-UL mixed slot structure (e.g., a self-contained slot structure) considered in the NR system, the CSI reporting may not be performed immediately in a slot in which the CSI reporting is triggered. Considering such a case, implementations disclosed herein set a Y value indicating the interval between the timing at which the CSI reporting is triggered and the timing at which the UE actually performs the CSI reporting.

The Y value may be expressed as a number of slots (i.e., slot unit) or a number of symbols (i.e., symbol unit) and may be pre-configured in the system or may be set (indicated) by the network (e.g., eNB).

In this case, the candidate value(s) for the Y may be supported according to the information included in the CSI report setting. For example, the candidate values for the Y may be set based on the CSI parameter, the CSI type (e.g., CSI type 1 or 2), a codebook configuration (e.g., codebook size), a recent CSI-RS transmission timing, DL-UL slot structure, a UE capability, a CSI calculation count related to the corresponding CSI reporting setting, and the like.

When the candidate values for the Y are set based on the above-described information, explicit signaling for the Y value may be not required. Of course, signaling for the Y value may also be performed in this case, and a lower limit value for the Y value may be set based on the above-described information.

Fourth Implementation—Flexible CSI Measuring and Reporting Technique Using Parameter Value of CSI Reporting Setting In relation with the CSI measurement and reporting of the UE, a minimum time interval (hereinafter, referred to as 'Z') may be implemented to perform the CSI reporting based on the timing when the corresponding UE actually receives the CSI-RS.

Such a minimum time interval Z may be implemented to mitigate problems that may occur in scenarios where a UE receives the CSI-RS from the eNB, but is unable to perform the measurement for the CSI-RS ahead of the indicated (i.e., triggered) CSI reporting timing.

In some implementations, the minimum time interval Z may correspond to a processing time interval that is required for the UE to report the CSI using the CSI-RS received from the eNB. For example, the Z may correspond to a minimum time gap between the CSI reporting timings compared with the CSI-RS transmission timing. Further, the Z may correspond to gap information for setting a measurement interval (or measurement gap) for generating a measurement value for the CSI reporting.

As an example, if a UE receives a CSI-RS within the minimum time interval Z (e.g., within the Z window) relative to the timing at which the UE performs the CSI reporting triggered by the eNB, then the UE may not have sufficient time to correctly measure the CSI-RS and therefore may not use the CSI-RS in the corresponding CSI reporting.

To mitigate such scenarios, the Z value may be configured (or set) considering a CSI calculation time (i.e., CSI processing time) required for the CSI reporting in the corresponding UE. For example, the Z value may be configured according to information elements that determine the CSI calculation processing time.

As a specific example, the Z value may be configured according to various parameter such as (i) CSI reporting setting parameters (e.g., CSI parameter, CSI type, (ii) codebook configuration information including CSI codebook type, codebook size, and codebook set (or subset) restriction, (iii) frequency granularity for the CQI and the PMI, etc.), and (iv) UE capability (e.g., UE computation capability).

For example, when the codebook to be used by the UE is configured (i.e., grouped) to a subset and limited to a specific codebook subset(s), the Z value may be configured small. The reason is that when the codebook subset is limited, a time required for the corresponding UE to select the codebook in order to perform the CSI measurement is reduced. That is, when the UE is configured to use only a specific range of codebook without applying all of the codebooks, the Z value may be configured small by the network (or the eNB).

The Z value may also be determined according to the number of CSI reporting settings dynamically selected via the L1 or L2 signaling. In addition, the required time may vary depending on the operation type of the time domain for the CSI reporting setting. Specifically, the Z values may be configured differently when two periodic CSI reporting settings are specified and two aperiodic (or semi-persistent) CSI reporting settings are specified. In addition, the Z value may be configured differently when one periodic CSI reporting setting is specified and two periodic CSI reporting settings are specified. That is, the Z value may be configured differently depending on how the CSI reporting setting is configured for the UE.

In some implementations, the Z value may be configured or indicated for each UE by the eNB (or network). For example, the Z value may be included in CSI reporting setting information transferred via the higher layer signaling (e.g., RRC signaling). As another example, the Z value may be transferred together with the CSI reporting setting dynamically indicated (or triggered) via the L1 or L2 signaling (i.e., DCI or MAC-CE).

In this case, the UE may report the Z value to the eNB as the capability thereof. As the UE reports the UE capability for the Z value to the eNB, the eNB may configured the Z value in consideration of the capability of the UE. That is, the Z value may be configured by an implicit technique by reporting the capability of the UE.

Hereinafter, some examples of specific techniques are described for performing CSI measurement and reporting in consideration of the Z value (i.e., a value indicating a time required until the CSI reporting is performed based on the CSI-RS transmission timing).

The CSI-RS may be configured (i.e., transmission-configured), triggered, or activated at a timing after the CSI reporting timing minus Z value when the UE is instructed to report the CSI from the eNB (i.e., when the CSI reporting is triggered). In this case, when the UE calculates the channel or interference estimation value for the CSI reporting, the UE may ignore the estimated value (or measurement value) calculated from the CSI-RS. Here, the CSI-RS resource used for the CSI reporting may be referred to as a reference resource for the corresponding CSI reporting and the Z value may be a parameter for setting the reference resource.

However, at a subsequent timing, the CSI reporting (i.e., additional CSI reporting) may be configured and when the CSI-RS exists before the corresponding reporting time minus the Z value, the estimation value from the CSI-RS previously ignored may be used in CSI reporting at the corresponding timing (i.e., a future timing).

In other words, the CSI-RS which exists within the previous time interval corresponding to the Z value based on the CSI reporting timing triggered by the eNB may not be used for the corresponding CSI reporting. For example, it is assumed that CSI reporting triggering is indicated in an n-th slot (#n slot), the CSI reporting timing is indicated to be performed in an n+8-th slot (#n+8 slot), and the Z value is indicated by two slots. In this case, the UE may ignore the value estimated by the CSI-RS received in the previous time interval corresponding to the Z value (i.e., #n+6 slot to #n+8 slot).

Figure 10A:
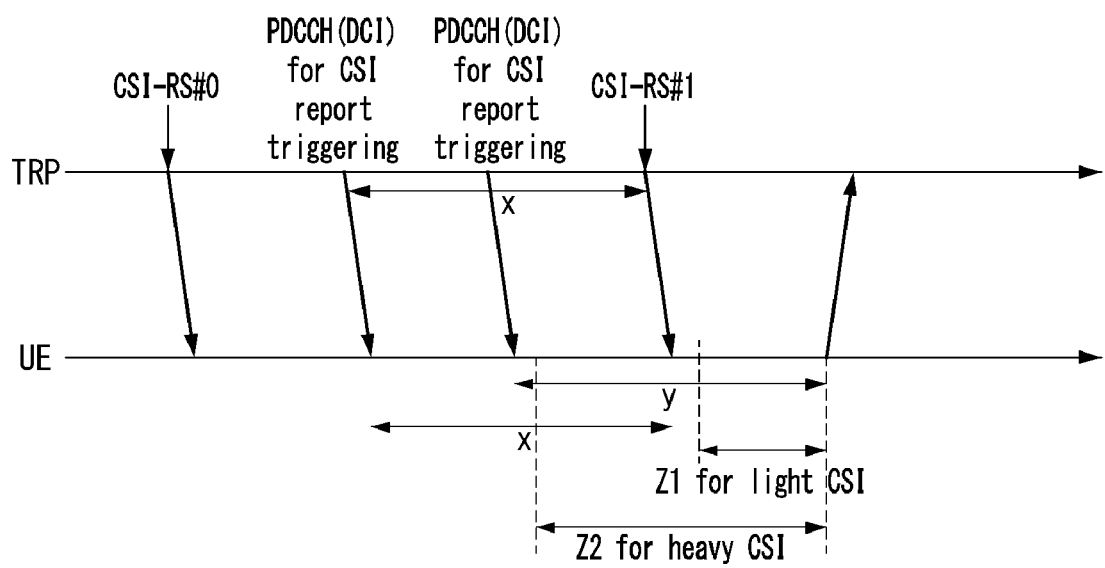
FIGS. 10A and 10B illustrate examples of measuring and reporting CSI to which implementations described in this disclosure may be applied.
Figure 10B:
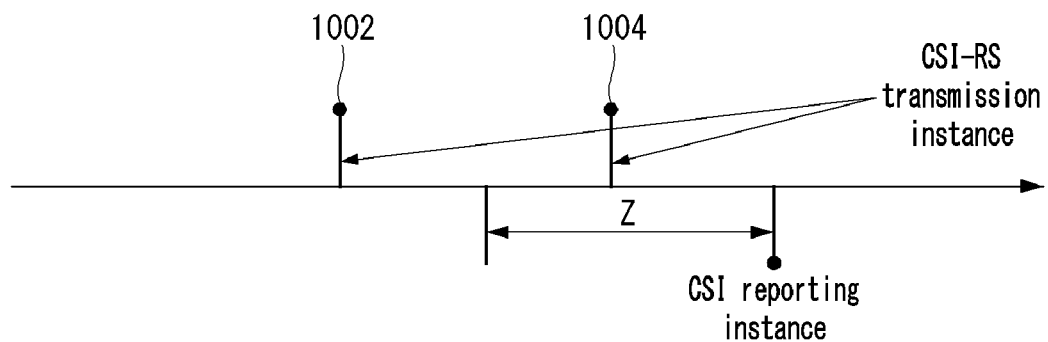

FIGS. 10A and 10B illustrate an example of measuring and reporting CSI to which implementations described in this disclosure may be applied. FIGS. 10A and 10B are merely illustrated as examples and do not limit the scope of the present disclosure.

Referring to FIGS. 10A and 10B, it is assumed that a UE and an eNB (i.e., TRP) perform a CSI measurement procedure and a reporting procedure based on the CSI framework described above.

FIG. 10A illustrates overall procedures of CSI measurement and reporting and configured values (i.e., X value, Y value, and Z value) associated therewith.

The 'X' illustrated in FIG. 10A indicates a time interval between the triggering/activation/deactivation timing for the transmission of the CSI-RS and actual transmission of the CSI-RS. As an example, in the case of CSI-RS #1, 'X' may mean an interval from a timing when the UE receives PDCCH (i.e., DCI) for triggering the corresponding CSI-RS to a timing when the UE actually receives the CSI-RS.

The 'Y' illustrated in FIG. 10A indicates a time interval between the triggering/activation/deactivation timing for the CSI reporting and an actual CSI reporting timing. As an example, 'Y' may mean the interval from a timing when the UE receives the PDCCH (i.e., DCI) including the triggering information for the CSI reporting to a timing when the UE directly performs the CSI reporting.

Further, as described above, the Z value may be configured according to various information elements and as an example, the Z value may be configured to 'Z1' for "light CSI" (i.e., CSI with low complexity) and 'Z2' for "heavy CSI" (i.e., CSI with high complexity) according to a predetermined reference (i.e., pre-configured reference).

Here, the "light CSI" may mean a CSI in which CSI processing time is configured to be small by the UE and the "heavy CSI" may mean CSI in which the CSI processing time is configured to be large. For example, CSI with N or more antenna ports associated with the CSI measurement and reporting may correspond to the heavy CSI, and CSI with less than N may correspond to the light CSI.

In this case, an estimation value (i.e., the channel or interference estimation value measured using the CSI-RS) for the CSI-RS received within a Z interval based on the triggered CSI reporting timing is not included in the information for the CSI reporting. That is, the Z value may be referred to as the measurement window and the estimation value for the received CSI-RS within the measurement window may be ignored in the CSI reporting.

For example, when the CSI reporting for Z1 is triggered, the UE may encapsulate an estimation value for CSI-RS #0 and an estimation value for CSI-RS #1 in the CSI reporting information. Unlike this, when the CSI reporting for Z2 is triggered, the UE may ignore the estimation value for the estimation value for CSI-RS #1 and encapsulate only the estimation value for CSI-RS #0 in the CSI reporting information.

FIG. 10B illustrates a simplified example in relation with the operation of the UE. Referring to FIG. 10B, a CSI-RS 1002 received before the Z value based on the CSI reporting instance is used for the corresponding CSI reporting and a received CSI-RS 1004 received thereafter may be ignored in the corresponding CSI reporting.

The operation of the UE may be applied to both the case where the aperiodic CSI-RS and/or aperiodic CSI reporting is triggered and the case where the periodic CSI-RS and/or periodic CSI reporting and the semi-persistent CSI-RS and/or semi-persistent CSI reporting are triggered. In other words, the operation of the UE may be applied irrespective of the operation type of the time domain of CSI-RS triggering (i.e., CSI-RS transmission triggering) and CSI reporting triggering.

Further, in various implementations of the present disclosure, when the CSI-RS triggering and the CSI reporting triggering exist at the same timing (for example, the same slot or the same symbol), a technique for determining whether the operation of the UE is performed according to a predetermined reference may be considered. Here, the predetermined reference may be configured by using the X, Y, and Z values. In particular, the Z value needs to be guaranteed between the Y and X values.

For example, whether the operation of the UE is performed may be determined by comparing a difference value between the Y and X values and the Z value.

Figure 11:
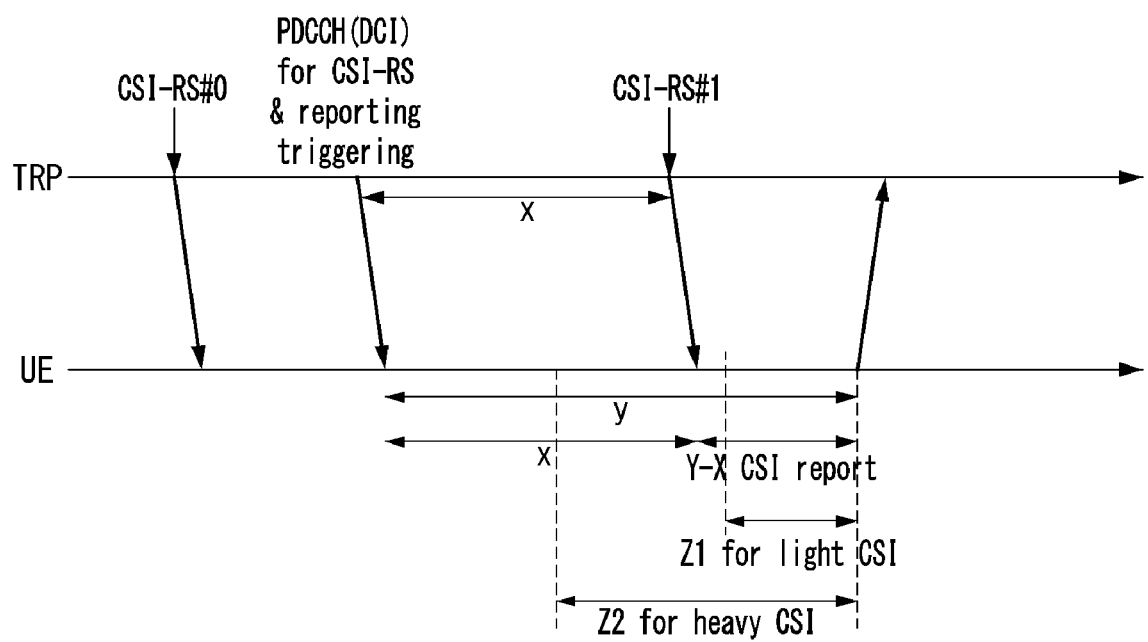
FIG. 11 illustrates another example of measuring and reporting CSI to which implementations described in this disclosure may be applied.

FIG. 11 illustrates another example of measuring and reporting CSI to which implementations described in this disclosure may be applied. FIG. 11 is just for convenience of the description and does not limit the scope of the present disclosure.

The description of the configuration and operation overlapping with the contents of FIGS. 10A and 10B in the contents of FIG. 11 will be omitted. In the case of FIG. 11, unlike that illustrated in FIGS. 10A and 10B, the CSI-RS triggering (specifically, triggering for CSI-RS #1) and the CSI reporting triggering may be indicated simultaneously via the PDCCH (i.e., DCI). In this case, two triggering may be indicated through one DCI or through two DCIs (i.e., each DCI).

In this case, whether an estimation value for a specific CSI-RS is to be included in the CSI reporting information may be determined by comparing the difference value (X–Y value) between the Y and X values and the Z value configured for the CSI reporting.

For example, for the case of CSI-RS #1, it is assumed that the Z1 value is smaller than the Y–X value and the Z2 value is larger than the Y–X value. In this case, when the CSI reporting for Z1 is triggered, the UE may encapsulate an estimation value for CSI-RS #0 and an estimation value for CSI-RS #1 in the CSI reporting information. Unlike this, when the CSI reporting for Z2 is triggered, the UE may ignore the estimation value for the estimation value for CSI-RS #1 and encapsulate only the estimation value for CSI-RS #0 in the CSI reporting information.

In other words, when the Z value is configured to be larger than the Y–X value, the estimation value (i.e., channel or interference estimation value) for the corresponding CSI-RS may be ignored in the corresponding CIS reporting of the UE. However, the ignored estimation value may be utilized in future CSI reporting (e.g., pre-configured or dynamically triggered/activated CSI reporting).

For reference, in the case of the legacy LTE system, the CSI reporting information is determined based on the estimation value of the CSI-RS before a timing (for example, (n−4)-th subframe) determined as the standard based on the CSI reporting timing. On the contrary, through the operation of the UE, more flexible CSI measurement and reporting may be performed in the NR system. In other words, by using the Z value configured in consideration of the actual CSI-RS transmission timing (CSI-RS transmission instance and actual CSI reporting instance), adaptive CSI reporting is available rather than CSI reporting through a uniformized technique (for example, n−4-th slot based on the n-th slot).

In addition, in various implementations of the present disclosure, when the Z value is configured for the CSI reporting for the UE, the estimation value calculated for the CSI reporting may vary depending on whether there is the measurement restriction which is the information element included in the CSI reporting setting. Here, whether there is the measurement restriction may be expressed by an indicator indicating measurement restriction ON or OFF. Here, the measurement restriction is configured to ON, which means that the UE is configured to perform the channel or interference estimation by using only the estimation value by the RS transmitted at the most recent timing among the RSs (e.g., CSI-RSs) transmitted at a plurality of instances.

Figure 12:
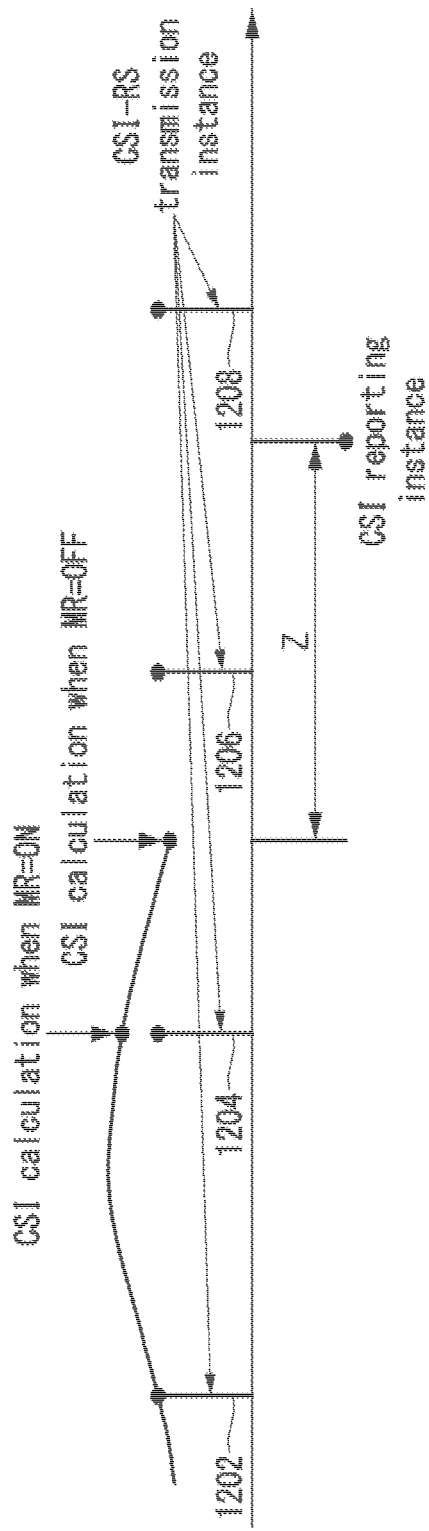
FIG. 12 illustrates yet another example of measuring and reporting CSI to which implementations described in this disclosure may be applied.

FIG. 12 illustrates yet another example of measuring and reporting CSI to which implementations described in this disclosure may be applied. FIG. 12 is just for convenience of the description and does not limit the scope of the present disclosure.

Referring to FIG. 12, it is assumed that the Z value and whether there is the measurement restriction is configured (or indicated) through the CSI report setting. Further, it is assumed that triggered CSI-RSs 1202 to 1208 are periodically transmitted, but the corresponding technique may not be limited only to the case where the CSI-RS is periodically transmitted but may be applied even to the case where CSI-RS is transmitted aperiodically or semi-persistently. Further, the aperiodic CSI reporting is assumed as the CSI reporting, but the present disclosure is not limited thereto and the corresponding technique may be applied even to the periodic CSI reporting or semi-persistent CSI reporting.

When the Z value is configured for the UE and the measurement restriction is indicated as ON, the UE may be configured to use the most recently measured estimation value (channel estimation value or interference estimation value) at a timing (i.e., CSI reporting timing–Z) before the Z value based on the CSI reporting timing. For example, the UE may perform the CSI calculation using only the recently received CSI-RS 1204 among the CSI-RSs 1202 and 1204 received before the time interval corresponding to the Z value based on the CSI reporting timing.

In this case, the position of the NZP CSI-RS symbol(s) for the channel measurement and the position of the ZP or NZP CSI-RS for the interference measurement closest before the time interval corresponding to the Z value based on the CSI reporting timing may be different. In this case, for each of the channel measurement and the interference measurement, the UE may use a CSI-RS-based measurement value transmitted before the time interval corresponding to the Z value based on the CSI reporting timing.

In addition, consecutive CSI-RSs are triggered, but only one estimation value which belongs to the timing before the Z value based on the CSI reporting timing may exist e.g., semi-persistent CSI-R) or aperiodic CSI-RS may be triggered at the timing before the Z value based on the CSI reporting timing. In this case, the UE may perform the CSI calculation based on the estimation value of the CSI-RS at the corresponding transmission timing.

On the contrary, when the Z value is configured for the UE and the measurement restriction is indicated as OFF or multiple estimation values exist at the timing before the Z value based on the CSI reporting timing (e.g., semi-persistent CSI-RS), the UE may perform the CSI calculation by using one or more estimation values up to the timing before the Z value based on the CSI reporting timing. In other words, when the measurement restriction is indicated as off, the UE may ignore a value measured by the CSI-RS received within the time interval (i.e., a 'Z duration' illustrated in FIG. 12) corresponding to the Z value based on the CSI reporting timing at the time of reporting the CSI. That is, in this case, the UE does not need to update the CSI reporting value according to the value measured by the CSI-RS received within the time interval corresponding to the Z value based on the CSI reporting timing.

In this case, the UE may calculate the CSI as an average value of one or more estimation values. In particular, the UE may calculate the CSI by applying a weighted average to one or more estimation values. In this case, the UE may apply a high weight to the recently estimated channel (i.e., CSI-RS).

Alternatively, the UE may use a value estimated by performing extrapolation up to the timing before the Z value based on the CSI reporting timing based on one or more estimation values as the channel estimation value or interference estimation value for the corresponding CSI reporting. For example, the UE may calculate the estimation value for the CSI-RS 1202 and the estimation value for the CSI-RS 1204 and then calculate a predicted estimation value by applying the extrapolation to the calculated value up to the CSI reporting timing–Z timing. Here, the extrapolation may mean an analysis technique of predicting and estimating a value after a predetermined time according to the degree of a specific value.

In the case of using the method, the UE has an advantage of being able to acquire the latest information on a channel state (i.e., connection state) rather than a case where a predetermined measurement timing is defined. Specifically, in the legacy LTE, the UE is configured to perform measurement only before a predetermined interval (e.g., (n−4)-th subframe) based on the CSI reporting timing. Compared thereto, the described technique of the present disclosure of acquiring information on the channel state up to the Z value configured considering a CSI calculation capability of the UE has an advantage of being capable of acquiring a more accurate (i.e., most recent channel state-reflected) channel (or interference) estimation value than that in the case of the legacy LTE.

Figure 13:
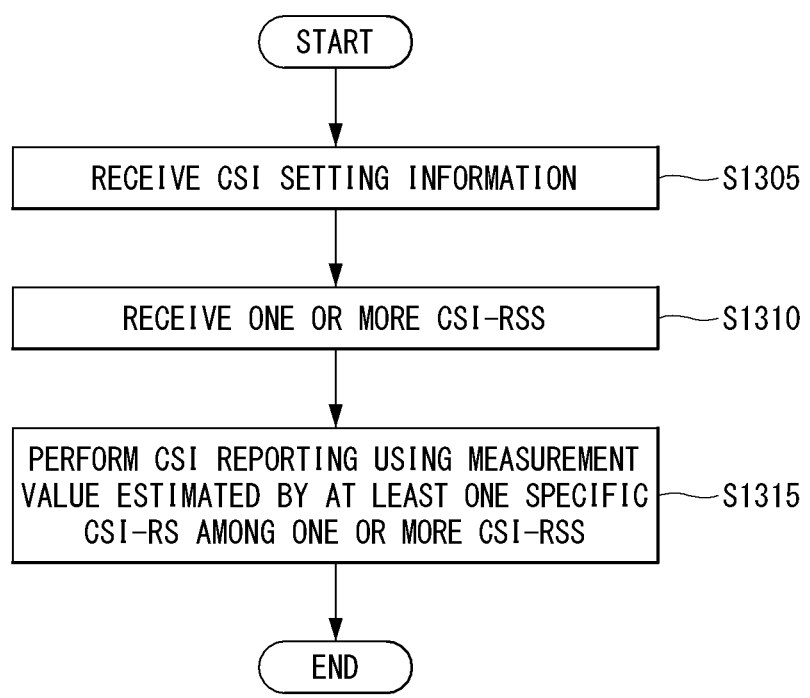
FIG. 13 illustrates an operation flowchart of a user equipment which measures and reports CSI to which implementations described in this disclosure may be applied.

FIG. 13 illustrates an operation flowchart of a user equipment which measures and reports CSI to which implementations described in this disclosure may be applied. FIG. 13 is just for convenience of the description and does not limit the scope of the present disclosure.

Referring to FIG. 13, it is assumed that the UE and the eNB perform the CSI measurement procedure and the reporting procedure based on the CSI framework described above and in this case, it is assumed that each of the above-described techniques is used independently or in combination with each other.

In step S1305, the UE receives CSI reporting setting information related with CSI reporting. As an example, as described above, the UE may receive triggering information for triggering the corresponding CSI reporting, that is, information about the specific CSI report setting(s). In particular, when the corresponding CSI reporting is configured to aperiodic, the terminal may receive the CSI reporting setting information via the triggering DCI of the CSI reporting.

In this case, before step S1305, the UE may receive information on the CSI framework (i.e., CSI measurement setting, CSI reporting setting, and CSI-RS resource setting) from the eNB through the higher layer signaling. Alternatively, the information on the CSI framework may be configured in advance for the UE and the eNB. In this case, the CSI reporting setting information received in step S1305 may be for a specific CSI reporting setting among previously received (or shared) CSI reporting settings.

Thereafter, in step S1310, the UE receives one or more CSI-RSs. Accordingly, the UE may perform channel measurement, interference measurement, or rate matching using the received CSI-RS.

Thereafter, in step S1315, the UE performs the CSI reporting by using a measurement value estimated by at least one specific CSI-RS among the one or more CSI-RSs. For example, the UE may perform the CSI reporting using only an estimation value for CSI-RS #0 among received CSI-RS #0 and CSI-RS #1.

In this case, the at least one specific CSI-RS may be determined based on gap information (e.g., the 'Z' value) for setting a measurement interval (or measurement window) for estimating the specific value and the timing at which the CSI reporting is performed. For example, the at least one specific CSI-RS may be received before a timing indicated by the gap information relative to the timing at which the CSI reporting is performed. That is, at least one specific CSI-RS used in the CSI reporting may refer to a CSI-RS received before the timing at which the CSI reporting is performed, minus the Z value.

Further, the gap information may indicate a processing time required for the UE to report the CSI using the CSI-RS received from the eNB. As an example, the gap information may be configured based on the processing time (i.e., CSI computation time).

Further, as described above, the UE may report the gap information of the UE to the eNB. In this case, the gap information may be determined based on the capability information of the UE.

In addition, the gap information may be configured by the eNB in consideration of a type (e.g., CSI type of high complexity or CSI type of low complexity) of CSI to be reported by the UE.

Further, the CSI reporting setting information may further include indication information indicating whether there is the measurement restriction for the CSI reporting. In this case, when the at least one CSI-RS corresponds to a CSI-RS configured as periodic or semi-persistent, the operation of the UE may be changed according to a value indicated by the indication information (e.g., the operation of FIG. 12).

For example, when the indication information indicates ON, the at least one specific CSI-RS may correspond to a last CSI-RS (most recent CSI-RS) that was received before the timing indicated by the gap information relative to the timing at which the CSI reporting is performed.

Unlike this, when the indication information indicates OFF, the at least one specific CSI-RS may correspond to a CSI-RS received before the time indicated by the gap information relative to the timing at which the CSI reporting is performed. That is, in this case, the CSI-RS received within the timing (e.g., within the Z window) indicated by the gap information may be ignored in the CSI reporting by the UE.

Further, when the one or more CSI-RSs correspond to aperiodic CSI-RSs, the at least one specific CSI-RS may correspond to an aperiodic CSI-RS received before the timing indicated by the gap information based on the performing timing of the CSI reporting. Alternatively, in this case, all CSI-RSs may correspond to aperiodic CSI-RSs received before the timing indicated by the gap information based on the performing timing of the CSI reporting.

Figure 14:
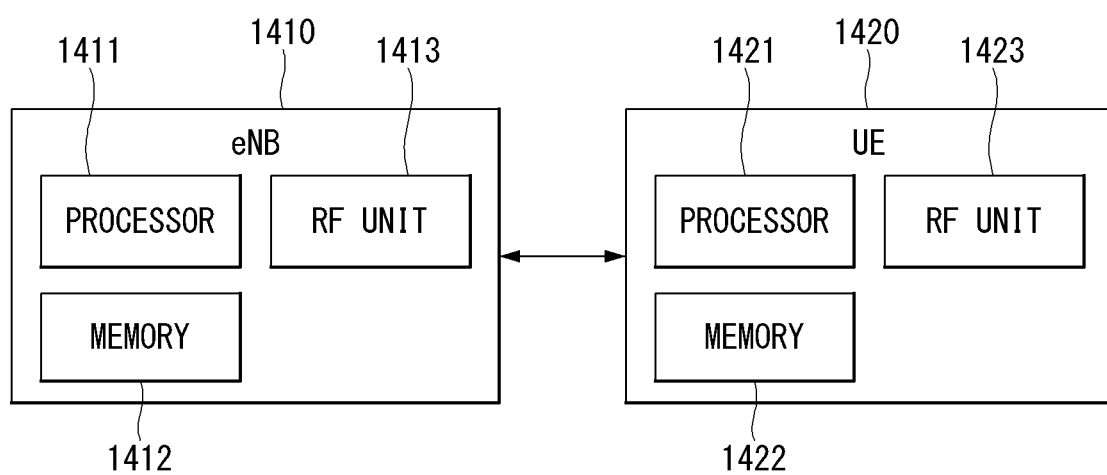
FIG. 14 illustrates a block diagram of a wireless communication device according to an implementation of the present disclosure.

Overview of Devices to which Implementations of the Present Disclosure are Applicable FIG. 14 illustrates a block diagram of a wireless communication device according to an implementation of the present disclosure.

Referring to FIG. 14, a wireless communication system includes a base station (or network) 1410 and a UE 1420.

The base station 1410 includes a processor 1411, a memory 1412, and a communication module 1413.

The processor 1411 implements a function, a process, and/or a technique which are described in FIGS. 1 to 13 above. Layers of a wired/wireless interface protocol may be implemented by the processor 1411. The memory 1412 is connected with the processor 1411 to store various pieces of information for driving the processor 1411. The communication module 1413 is connected with the processor 1411 to transmit and/or receive a wired/wireless signal.

The communication module 1413 may include a radio frequency (RF) unit for transmitting/receiving a radio signal.

The UE 1420 includes a processor 1421, a memory 1422, and a communication module (or RF unit) 1423. The processor 1421 implements a function, a process, and/or a method which are described in FIGS. 1 to 13 above. The layers of the wireless interface protocol may be implemented by the processor 1421. The memory 1422 is connected with the processor 1421 to store various pieces of information for driving the processor 1421. The communication module 1423 is connected with the processor 1421 to transmit and/or receive the wireless signal.

The memories 1412 and 1422 may be positioned inside or outside the processors 1411 and 1421 and connected with the processors 1411 and 1421 by various well-known means.

Further, the base station 1410 and/or the UE 1420 may have a single antenna or multiple antennas.

Figure 15:
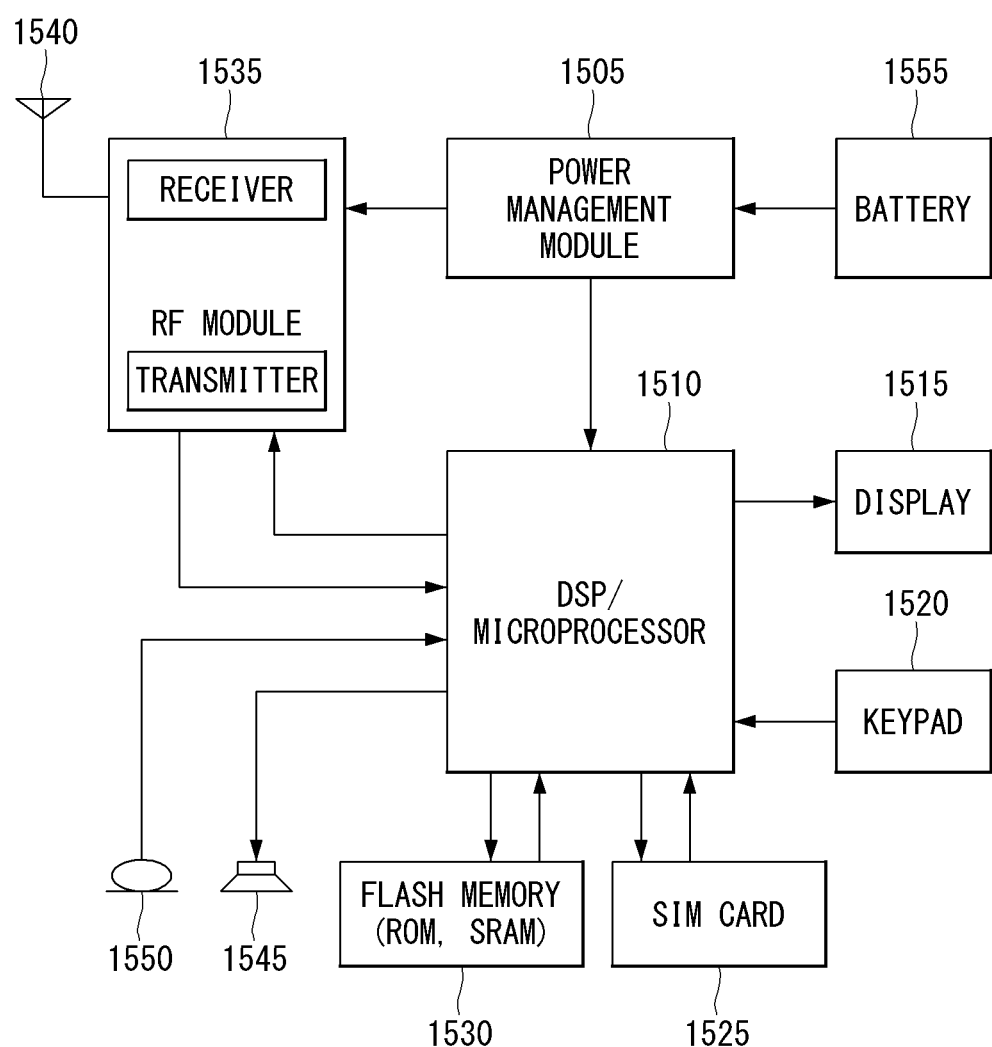
FIG. 15 illustrates a block diagram of a communication device according to an implementation of the present disclosure.

FIG. 15 illustrates a block diagram of a communication device according to an implementation of the present disclosure.

In particular, FIG. 15 is a diagram more specifically illustrating the UE of FIG. 14 above.

Referring to FIG. 15, the UE may be configured to include a processor (or a digital signal processor (DSP) 1510, an RF module (or RF unit) 1535, a power management module 1505, an antenna 1540, a battery 1555, a display 1515, a keypad 1520, a memory 1530, a subscriber identification module (SIM) card 1525 (this component is optional), a speaker 1545, and a microphone 1550. The UE may also include a single antenna or multiple antennas.

The processor 1510 implements a function, a process, and/or a method which are described in FIGS. 1 to 13 above. Layers of a wireless interface protocol may be implemented by the processor 1510.

The memory 1530 is connected with the processor 1510 to store information related to an operation of the processor 1510. The memory 1530 may be positioned inside or outside the processor 1510 and connected with the processor 1510 by various well-known means.

A user inputs command information such as a telephone number or the like by, for example, pressing (or touching) a button on the keypad 1520 or by voice activation using the microphone 1550. The processor 1510 receives such command information and processes to perform appropriate functions including dialing a telephone number. Operational data may be extracted from the SIM card 1525 or the memory 1530. In addition, the processor 1510 may display command information or drive information on the display 1515 for the user to recognize and for convenience.

The RF module 1535 is connected with the processor 1510 to transmit and/or receive an RF signal. The processor 1510 transfers the command information to the RF module 1535 to initiate communication, for example, to transmit radio signals constituting voice communication data. The RF module 1535 is constituted by a receiver and a transmitter for receiving and transmitting the radio signals. The antenna 1540 functions to transmit and receive the radio signals. Upon receiving the radio signals, the RF module 1535 may transfer the signal for processing by the processor 1510 and convert the signal to a baseband. The processed signal may be converted into to audible or readable information output via the speaker 1545.

The aforementioned implementations are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the implementations of the present disclosure. The order of operations described in the implementations of the present disclosure may be changed. Some structural elements or features of one implementation may be included in another implementation, or may be replaced with corresponding structural elements or features of another implementation. Moreover, it is apparent that some claims referring to specific claims may be combined with another claims referring to the other claims other than the specific claims to constitute the implementation or add new claims by means of amendment after the application is filed.

The implementations of the present disclosure may be achieved by various means, for example, hardware, firmware, software, or a combination thereof. In a hardware configuration, the methods according to the implementations of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the implementations of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

INDUSTRIAL APPLICABILITY

Although various examples for measuring and reporting channel state information in the wireless communication system of the present disclosure has been described with reference to an example applied to a 3GPP LTE/LTE-A system or a 5G system, the implementations disclosed herein may be applied to various wireless communication systems in addition to the 3GPP LTE/LTE-A system or 5G system.

The invention claimed is:

1. A method of performing, by a user equipment (UE), channel state information (CSI) reporting in a wireless communication system, the method comprising:
  receiving, from a base station, CSI reporting setting information related to the CSI reporting;
  receiving, from the base station, at least one CSI-reference signal (CSI-RS) based on the CSI reporting setting information;
  computing a measurement value based on the at least one CSI-RS, the at least one CSI-RS being determined based on gap information related to computation of the measurement value; and
  performing the CSI reporting based on the measurement value,
  wherein the gap information is defined based on information for a frequency granularity,
  wherein the gap information represents a gap between a specific timing and a timing of the CSI reporting, and
  wherein the measurement value is computed based on the at least one CSI-RS being received before the specific timing.

2. The method of claim 1, wherein the timing of the at least one CSI-RS occurs prior to a time instance that is indicated by the gap information relative to the timing of the CSI reporting.

3. The method of claim 2, wherein the gap information is determined based on a codebook type that is configured for the UE.

4. The method of claim 1, wherein the gap information is configured by the base station based on a type of CSI to be reported by the UE.

5. The method of claim 1, wherein, based on a measurement restriction related to the CSI reporting having been configured for the UE, the measurement value is determined based on a most recent CSI-RS that was received before a time instance that is indicated by the gap information relative to the timing of the CSI reporting.

6. The method of claim 5, wherein based on the measurement restriction related to the CSI reporting not having been configured for the UE, the measurement value is determined as an average value of one or more values computed by using the at least one CSI-RS.

7. The method of claim 6, wherein the average value is calculated by applying a weighted average according to a reception timing of each of the at least one CSI-RS.

8. The method of claim 6, wherein the measurement value is estimated up to a time instance indicted by the gap information relative to the timing of the CSI reporting, based on the average value calculated by using the at least one CSI-RS.

9. The method of claim 1, wherein, based on the at least one CSI-RS being aperiodically configured, the at least one CSI-RS corresponds to an aperiodic CSI-RS that is received before a time instance that is indicated by the gap information relative to the timing of the CSI reporting.

10. The method of claim 1, further comprising:
  receiving resource setting information related to transmission of the at least one CSI-RS,
  wherein the resource setting information comprises first offset information indicating a first time interval between (i) a triggering timing for triggering the transmission of the CSI-RS and (ii) a transmission timing of the CSI-RS, and
  wherein the CSI reporting setting information further comprises second offset information indicating a second time interval between (i) a triggering timing for triggering the CSI reporting and (ii) the timing of the CSI reporting at which the CSI reporting is performed.

11. A User Equipment (UE) configured to perform channel state information (CSI) reporting in a wireless communication system, the UE comprising:
  at least one transceiver;
  at least one processor; and
  at least one computer memory operably connectable to the at least one processor and storing instructions that, when executed by the at least one processor, perform operations comprising:
    receiving, from a base station, CSI reporting setting information related to the CSI reporting;
    receiving, from the base station, at least one CSI-reference signal (CSI-RS) based on the CSI reporting setting information;
    computing a measurement value based one the at least one CSI-RS, the at least one CSI-RS being determined based on gap information related to computation of the measurement value; and
    performing the CSI reporting based on the measurement value,
    wherein the gap information is defined based on information for a frequency granularity,
    wherein the gap information represents a gap between a specific timing and a timing of the CSI reporting, and
    wherein the measurement value is computed based on the at least one CSI-RS being received before the specific timing.

12. The UE of claim 11, wherein the timing of the at least one CSI-RS occurs prior to a time instance that is indicated by the gap information relative to the timing of the CSI reporting.

13. A base station configured to receive channel state information (CSI) reporting in a wireless communication system, the base station comprising:
  at least one transceiver;
  at least one processor; and
  at least one computer memory operably connectable to the at least one processor and storing instructions that, when executed by the at least one processor, perform operations comprising:

transmitting, to a user equipment, CSI reporting setting information related to the CSI reporting;

transmitting, to the user equipment, at least one CSI-reference signal (CSI-RS) based on the CSI reporting setting information;

wherein a measurement value is computed based on the at least one CSI-RS, the at least one CSI-RS being determined based on gap information related to computation of the measurement value; and receiving the CSI reporting that is performed based on the measurement value, wherein the gap information is defined based on information for a frequency granularity, wherein the gap information represents a gap between a specific timing and a timing of the CSI reporting, and wherein the measurement value is computed based on the at least one CSI-RS being received before the specific timing.

14. The base station of claim 13, wherein the timing of the at least one CSI-RS occurs prior to a time instance that is indicated by the gap information relative to the timing of the CSI reporting.

15. The method of claim 1, wherein the gap information is defined based on information for a number of CSI reporting settings.

16. The UE of claim 11, wherein the gap information is defined based on information for a number of CSI reporting settings.

17. The base station of claim 13, wherein the gap information is defined based on information for a number of CSI reporting settings.

* * * * *